(12) United States Patent
Sugishita et al.

(10) Patent No.: US 7,380,243 B2
(45) Date of Patent: May 27, 2008

(54) IMAGE FORMING APPARATUS OF WHICH PROGRAMS ARE REMOTELY UPDATABLE

(75) Inventors: Satoru Sugishita, Kanagawa (JP); Yoshihiko Abe, Kanagawa (JP); Ryohichi Katoh, Kanagawa (JP); Katsuhiko Sasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 693 days.

(21) Appl. No.: 10/713,195

(22) Filed: Nov. 17, 2003

(65) Prior Publication Data

US 2004/0145766 A1 Jul. 29, 2004

(30) Foreign Application Priority Data

| | | | |
|---|---|---|---|
| Nov. 18, 2002 | (JP) | | 2002-333966 |
| Nov. 26, 2002 | (JP) | | 2002-342827 |
| Nov. 29, 2002 | (JP) | | 2002-348317 |
| Oct. 24, 2003 | (JP) | | 2003-364032 |

(51) Int. Cl.
*G06F 9/44* (2006.01)
*G06F 1/24* (2006.01)
*G06F 15/00* (2006.01)

(52) U.S. Cl. .................. 717/168; 358/1.15; 713/100
(58) Field of Classification Search ............... 717/168
See application file for complete search history.

(56) References Cited

U.S. PATENT DOCUMENTS

| | | | | | |
|---|---|---|---|---|---|
| 4,007,450 A | * | 2/1977 | Haibt et al. | .................. | 709/226 |
| 5,121,113 A | * | 6/1992 | Kedge et al. | ................ | 345/168 |
| 5,276,877 A | * | 1/1994 | Friedrich et al. | ............ | 718/105 |
| 5,579,522 A | * | 11/1996 | Christeson et al. | ............. | 713/2 |
| 5,727,134 A | * | 3/1998 | Higuchi et al. | ............... | 358/1.1 |
| 5,841,972 A | * | 11/1998 | Fanshier | ..................... | 709/220 |
| 5,870,086 A | * | 2/1999 | Bang | .......................... | 345/212 |
| 5,937,150 A | * | 8/1999 | Phan | ......................... | 358/1.15 |
| 6,128,733 A | * | 10/2000 | Miyaguchi et al. | ............ | 713/2 |
| 6,167,567 A | * | 12/2000 | Chiles et al. | ................ | 717/173 |
| 6,195,750 B1 | * | 2/2001 | Ellsworth | .................... | 713/100 |
| 6,347,396 B1 | * | 2/2002 | Gard et al. | .................. | 717/168 |
| 6,389,556 B1 | * | 5/2002 | Qureshi | ....................... | 714/15 |

(Continued)

OTHER PUBLICATIONS

U.S. Appl. No. 11/500,955, filed Aug. 9, 2006, Sugishita.
U.S. Appl. No. 10/251,833, filed Sep. 23, 2002, Sugishita.
U.S. Appl. No. 10/601,672, filed Jun. 24, 2003, Sugishita et al.
U.S. Appl. No. 10/713,195, filed Nov. 17, 2003, Sugishita et al.
U.S. Appl. No. 11/828,051, filed Jul. 25, 2007, Sugishita.
U.S. Appl. No. 11/137,759, filed May 26, 2005, Sugishita et al.

*Primary Examiner*—Eric B. Kiss
*Assistant Examiner*—J. Derek Rutten
(74) *Attorney, Agent, or Firm*—Oblon, Spivak, McClelland, Maier & Neustadt, P.C.

(57) ABSTRACT

An image forming apparatus is disclosed that includes one or more processing units, a control unit, an update program acquiring unit that acquires an update program for updating programs of the processing units and the control unit, and a program updating unit that updates the programs of the processing units in the order of the number of the other processing units through which the control unit communicates with each of the processing units. The order in which the processing units are updated is determined based on the number of other processing units via which each of the processing units communicates with the control unit.

42 Claims, 33 Drawing Sheets

| PROGRAM NAME | PRIORITY |
|---|---|
| PROGRAM A | 1 |
| PROGRAM B | 2 |
| PROGRAM C | 2 |
| PROGRAM D | 3 |
| ... | ... |
| PROGRAM E | 10 |
| ... | ... |
| PROGRAM F | 20 |

U.S. PATENT DOCUMENTS

| | | | |
|---|---|---|---|
| 6,639,687 B1 * | 10/2003 | Neilsen | 358/1.14 |
| 6,785,843 B1 * | 8/2004 | McRae et al. | 714/23 |
| 6,857,121 B1 * | 2/2005 | Wadt | 717/170 |
| 6,883,093 B2 * | 4/2005 | McBrearty et al. | 713/100 |
| 7,142,321 B2 * | 11/2006 | Tomita et al. | 358/1.15 |
| 7,219,301 B2 * | 5/2007 | Barrie et al. | 715/751 |
| 2003/0025927 A1 * | 2/2003 | Hino et al. | 358/1.13 |
| 2004/0145766 A1 | 7/2004 | Sugishita et al. | |

\* cited by examiner

FIG.8

| PROGRAM NAME | PRIORITY |
|---|---|
| PROGRAM A | 1 |
| PROGRAM B | 2 |
| PROGRAM C | 2 |
| PROGRAM D | 3 |
| ... | ... |
| PROGRAM E | 10 |
| ... | ... |
| PROGRAM F | 20 |

FIG.9
| PROGRAM NAME | PRIORITY |
|---|---|
| PROGRAM A | 1 |
| PROGRAM B | 2 |
| PROGRAM C | 2 |
| PROGRAM D | 3 |
| ... | ... |
| PROGRAM E | 10 |
| ... | ... |
| PROGRAM F | 20 |
| ACQUIRED UPDATE PROGRAM |
|---|
| PROGRAM E |
| PROGRAM F |
| PROGRAM D |
| PROGRAM A |
| PROGRAM E | 10 |
|---|---|
| PROGRAM F | 20 |
| PROGRAM D | 3 |
| PROGRAM A | 1 |
~70
| PROGRAM A | 1 |
|---|---|
| PROGRAM D | 3 |
| PROGRAM E | 10 |
| PROGRAM F | 20 |
~71

FIG.10

| PROGRAM NAME | VERSION | PRIORITY | STATUS |
|---|---|---|---|
| FINISHER FIRMWARE | Ver.2.11 | 1 | EXECUTED |
| FCU FIRMWARE | Ver.1.03 | 5 | EXECUTED |
| CONTROLLER FIRMWARE | Ver.1.22 | 10 | EXECUTED |
| OPERATIONS PANEL FIRMWARE | Ver.1.35 | 20 | EXECUTED |

FIG.17

| PROGRAM NAME | VERSION | MODULE ID | STATUS |
|---|---|---|---|
| PLOTTER ENGINE PROGRAM | Ver.1.03 | JP2CFa_elpot | NOT YET EXECUTED |
| SCANNER ENGINE PROGRAM | Ver.1.22 | JP2CFa_escan | NOT YET EXECUTED |
| CONTROLLER PROGRAM | Ver.2.11 | JP2CFd_system | NOT YET EXECUTED |
| PRINTER APPLICATION PROGRAM | Ver.1.35 | JP2CFd_printer | NOT YET EXECUTED |
| FACSIMILE APPLICATION PROGRAM | Ver.1.08 | JP2CFa_fax | NOT YET EXECUTED |
| OPERATIONS PANEL PROGRAM | Ver.1.40 | JP2CFe_epanel | NOT YET EXECUTED |

FIG.18

| PROGRAM NAME | VERSION | MODULE ID |
|---|---|---|
| PLOTTER ENGINE PROGRAM | Ver.1.02 | JP2CFa_elpot |
| SCANNER ENGINE PROGRAM | Ver.1.20 | JP2CFa_escan |
| CONTROLLER PROGRAM | Ver.2.07 | JP2CFd_system |
| PRINTER APPLICATION PROGRAM | Ver.1.35 | JP2CFd_printer |
| COPIER APPLICATION PROGRAM | Ver.1.05 | JP2CFa_copy |
| OPERATIONS PANEL PROGRAM | Ver.1.39 | JP2CFd_epanel |

FIG.19

| PROGRAM NAME | VERSION | MODULE ID | STATUS |
|---|---|---|---|
| PLOTTER ENGINE PROGRAM | Ver.1.03 | JP2CFa_elpot | NOT YET EXECUTED |
| SCANNER ENGINE PROGRAM | Ver.1.22 | JP2CFa_escan | NOT YET EXECUTED |
| CONTROLLER PROGRAM | Ver.2.11 | JP2CFd_system | NOT YET EXECUTED |
| PRINTER APPLICATION PROGRAM | Ver.1.35 | JP2CFd_printer | NOT YET EXECUTED |
| OPERATIONS PANEL PROGRAM | Ver.1.40 | JP2CFd_epanel | NOT YET EXECUTED |

FIG.28

| PROGRAM NAME | VERSION BEFORE UPDATE | VERSION AFTER UPDATE | UPDATE RESULT |
|---|---|---|---|
| ENGINE PROGRAM | V1.00 | V1.03 | NORMAL |
| CONTROLLER PROGRAM | V1.00 | V1.03 | NORMAL |
| PRINTER APPLICATION PROGRAM | V1.00 | NULL | NULL |
| OPERATIONS UNIT PROGRAM | V1.00 | V1.01 | NORMAL |

FIG.29

| DATE OF UPDATE |
|---|
| yyyy.mm.dd.hh.mm |

FIG.30

REMOTE MAINTENANCE REPORT

217 { AS A PART OF REMOTE MAINTENANCE SERVICE
COMPUTER PROGRAMS STORED IN ROM
HAVE BEEN UPDATED REMOTELY

| PROGRAMS | VERSION BEFORE UPDATE | VERSION AFTER UPDATE | RESULT OF UPDATE |
|---|---|---|---|
| ENGINE PROGRAM | V1.00 | → V1.03 | NORMALLY UPDATED |
| CONTROLLER PROGRAM | V1.00 | → V1.03 | NORMALLY UPDATED |
| PRINTER APPLICATION PROGRAM | V1.00 | | NO NEED TO UPDATE NOW |
| OPERATIONS UNIT PROGRAM | V1.00 | → V1.01 | NORMALLY UPDATED |

211　　　　　　212　　　213　　　　　　214

FURTHER INFORMATION ABOUT UPDATED
COMPUTER PROGRAMS IS ALSO AVAILABLE FROM OUR WEB SITE

DATE AND TIME OF UPDATE: NOVEMBER 01; 02:00 AM

TO: ADMINISTRATOR

217 { AS A PART OF REMOTE MAINTENANCE SERVICE
COMPUTER PROGRAMS STORED IN ROM
HAVE BEEN UPDATED REMOTELY

| PROGRAMS | VERSION BEFORE UPDATE | VERSION AFTER UPDATE | RESULT OF UPDATE |
|---|---|---|---|
| ENGINE PROGRAM | V1.00 → | V1.03 | NORMALLY UPDATED |
| CONTROLLER PROGRAM | V1.00 → | V1.03 | NORMALLY UPDATED |
| PRINTER APPLICATION PROGRAM | V1.00 | | NO NEED TO UPDATE NOW |
| OPERATIONS UNIT PROGRAM | V1.00 → | V1.01 | NORMALLY UPDATED |
| 211 | 212 | 213 | 214 |

FURTHER INFORMATION ABOUT UPDATED
COMPUTER PROGRAMS IS ALSO AVAILABLE FROM OUR WEB SITE

DATE AND TIME OF UPDATE: NOVEMBER 01; 02:00 AM

| PROGRAM NAME | VERSION BEFORE UPDATE | VERSION AFTER UPDATE | UPDATE RESULT | DATE OF UPDATE |
|---|---|---|---|---|
| ENGINE PROGRAM | V1.00 | V1.03 | NORMAL | 2002.11.01.02.00 |
| CONTROLLER PROGRAM | V1.00 | V1.03 | NORMAL | |
| PRINTER APPLICATION PROGRAM | V1.00 | NULL | NULL | |
| OPERATIONS UNIT PROGRAM | V1.00 | V1.01 | NORMAL | |
| ENGINE PROGRAM | V1.00 | NULL | NULL | 2002.08.05.02.00 |
| CONTROLLER PROGRAM | V0.90 | V1.00 | NORMAL | |
| PRINTER APPLICATION PROGRAM | V0.80 | V1.00 | NORMAL | |
| OPERATIONS UNIT PROGRAM | V0.75 | V1.00 | NORMAL | |
| ... | ... | ... | ... | ... |
| ENGINE PROGRAM | V0.01 | V0.20 | NORMAL | 2001.12.15.04.00 |
| CONTROLLER PROGRAM | V0.10 | V0.20 | NORMAL | |
| PRINTER APPLICATION PROGRAM | V0.20 | V0.10 | NORMAL | |
| OPERATIONS UNIT PROGRAM | V0.15 | V0.30 | NORMAL | |

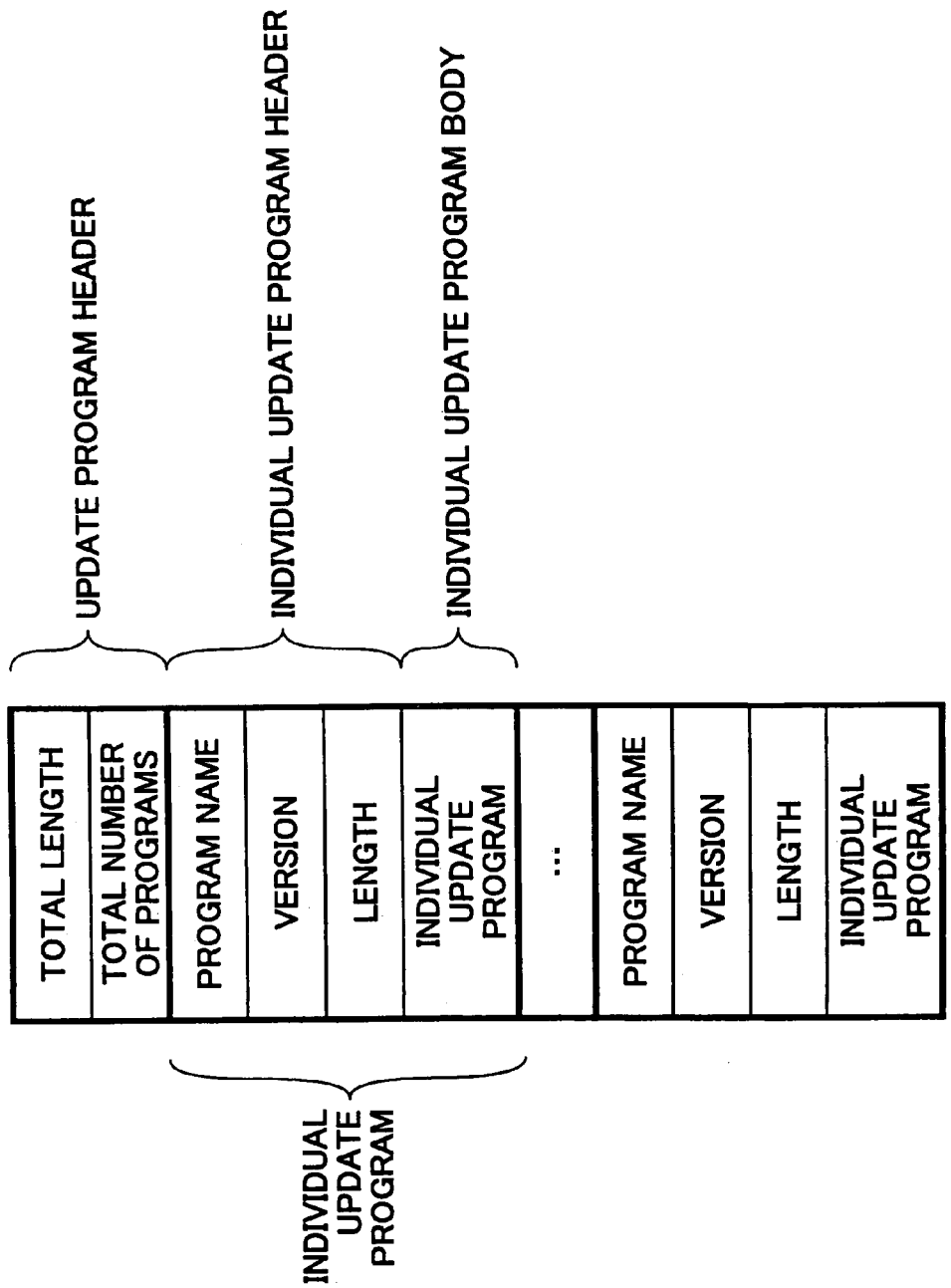

IMAGE FORMING APPARATUS OF WHICH PROGRAMS ARE REMOTELY UPDATABLE

BACKGROUND OF THE INVENTION

1. Field of the Invention

The present invention generally relates to an image forming apparatus, and more particularly, to an image forming apparatus of which programs can be updated remotely and a method of remotely updating programs of the image forming apparatus.

2. Description of the Related Art

Multifunctional peripherals are known and widely used. A multifunctional peripheral (MFP) is an image forming apparatus in which various functions of a facsimile machine, a printer, a copier, and a scanner, for example, are integrated. The MFP includes hardware resources such as a display unit, an image forming unit, and an image capturing unit. The MFP further includes application programs such as a facsimile application, a printer application, a copier application, and a scanner application, for example. The facsimile application, the printer application, the copier application, and the scanner application cause the MFP to operate as a facsimile machine, a printer, a copier, and a scanner, respectively.

The MFP is operated by various programs such as the application programs and modules stored in non-volatile RAM (NV-RAM), for example. It is possible to add new functions to the MFP and/or improve existing functions of the MFP by updating the programs stored in the NV-RAM. The programs of the MFP may be updated by accessing a server via a network such as the Internet thereby to download an update program stored in the server.

The update program downloadable from the server usually includes a plurality of individual programs. For example, one individual program updates the printer application, and another individual program updates a program for controlling paper handling mechanism. The plurality of individual programs are combined into a series of data.

The data structure of the update program is shown in FIG. 37. As shown in FIG. 37, the update program includes an update program header followed by a plurality of individual update programs each of which includes an individual update program header and an individual update program body.

The update program header includes a "total length" and a "total number of programs". The total length indicates the data length of the update program except for the update program header. The total number of programs indicates the total number of individual update programs included in the update program.

The individual update program header includes a "program name", a "version", and a "length". The program name indicates the name of a program (a printer application, for example) that is to be updated by the individual update program. The version indicates the version of the individual update program. The length indicates the length of the individual update program body.

If the individual update programs are executed in the order in which the individual update programs are arranged in the data structure of the update program as shown in FIG. 37, the update program may not work properly because of reasons described below.

Additionally, when the MFP is remotely updated, if the MFP is not rebooted, an operator of the MFP may need to understand that the MFP has been remotely updated from what is displayed on a screen of the display unit of the MFP, and the operator may need to manually reboot (power off and on) the MFP.

If the MFP is updated at night, the operator may not know that the MFP has been updated and whether the update is successful.

SUMMARY OF THE INVENTION

It is a general object of the present invention to provide a novel and useful image forming apparatus in which one or more of the above problems are eliminated. Another and more specific object of the present invention is to provide a method of updating programs of the MFP and an image forming apparatus of which programs can be remotely updated using the method.

To achieve at least one of the above objects, an image forming apparatus according to the present invention includes: one or more processing units wherein each processing unit processes data for forming an image; a control unit that communicates with each one of said processing units directly or indirectly through another one or more of said processing units; an update program acquiring unit that acquires an update program for updating programs of said processing units and a program of said control unit; and a program updating unit that updates the programs of the processing units in the order of the number of the other processing units through which the control unit communicates with the processing unit.

When the programs installed in the control unit and the processing units are updated, the update program acquiring unit acquires the update program from a source connected via a network. The update program contains individual update programs corresponding to respective programs to be updated. The program updating unit transfers the individual update programs to the corresponding processing unit. The order in which the processing units are updated is determined based on the number of other processing units via which the processing unit communicates with the control unit. For example, a processing unit that communicates with the control unit via two processing units is updated before another processing unit that communicates with the control unit via one processing unit. A processing unit that communicates with the control unit via one processing unit is updated before another processing unit that communicates with the control unit directly.

Other objects, features, and advantages of the present invention will become more apparent from the following detailed description when read in conjunction with the accompanying drawings.

BRIEF DESCRIPTION OF THE DRAWINGS

FIG. 8 is a table showing the priority of update according to the first embodiment;

FIG. 9 illustrates with tables a process in which an order of update is determined and update order information is created;

FIG. 10 is a table showing the update order information according to the embodiment;

FIG. 17 shows an exemplary update management table according to the embodiment;

FIG. 18 is a table showing the contents of the update program according to the embodiment;

FIG. 19 illustrates an exemplary update management table according to the embodiment;

FIG. 28 illustrates exemplary update result information in a table;

FIG. 29 illustrates exemplary update date information in a table;

FIG. 30 illustrates exemplary update results that are printed;

FIG. 32 illustrates an exemplary e-mail message according to an embodiment;

FIG. 36 illustrates with a table an update log according to an embodiment; and

FIG. 37 is a data diagram of an update program according to an embodiment.

DETAILED DESCRIPTION OF THE PREFERRED EMBODIMENTS

The preferred embodiments of the present invention are described with reference to the drawings in detail below. In the following description, the downloading of an update program means the update program is acquired and stored in a predetermined region in memory, for example.

Figure 1:
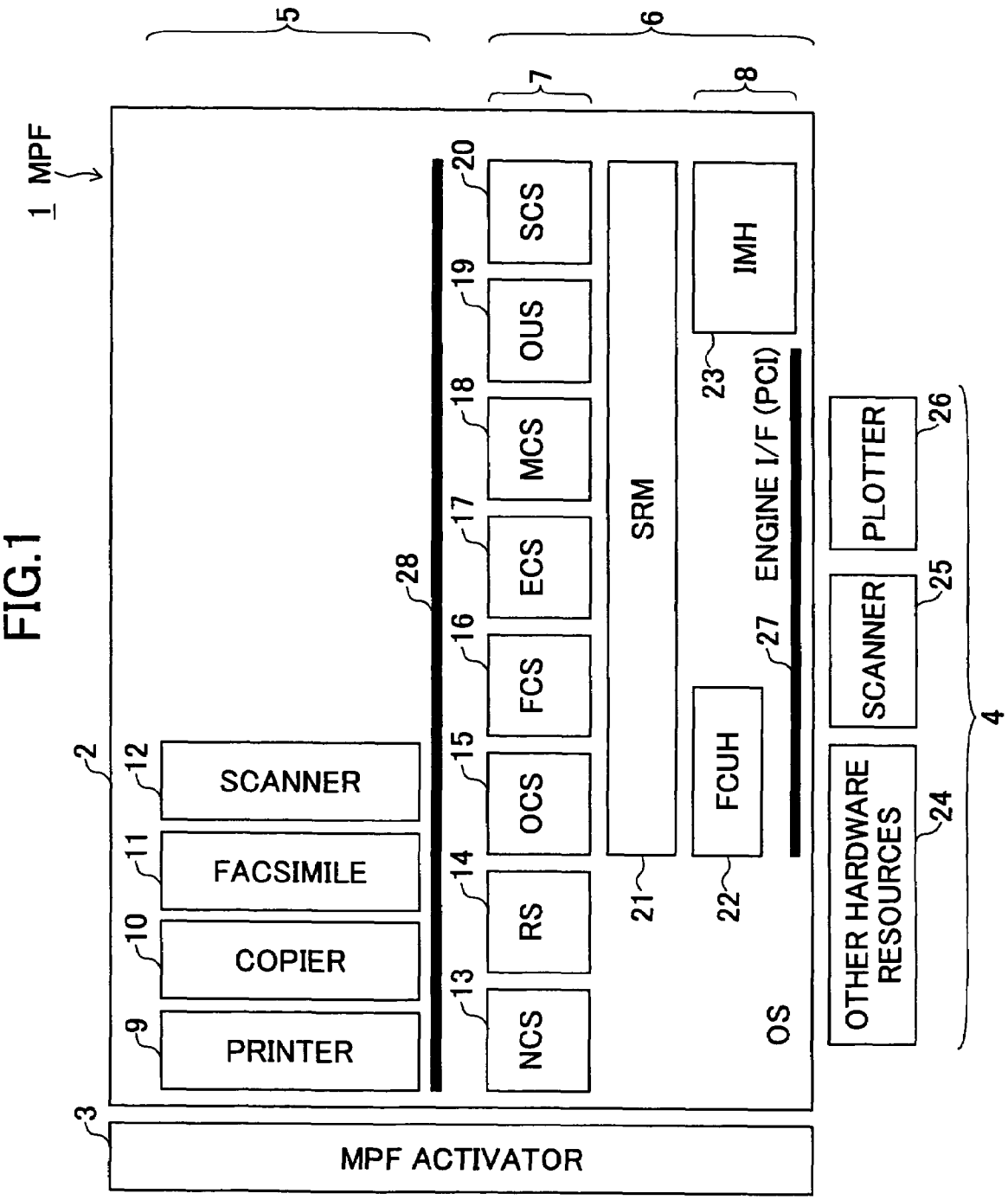
FIG. 1 is a schematic diagram showing the structure of an MFP according to an embodiment of the present invention.

FIG. 1 shows the structure of a multifunctional peripheral (MFP) according to a first embodiment. The MFP 1 includes software programs 2, an MFP start unit 3, and hardware resources 4.

When the MFP 1 is powered on, the MFP start unit 3 is started first, and activates an application layer 5 and a platform layer 6. The MFP start unit 3 reads programs of the application layer 5 and the platform layer 6 from a Hard Disk Drive (HDD) and writes the programs to a memory region, for example, and activates the programs. The hardware resources 4 include a scanner 25, a plotter 26, and other hardware resources 24 such as an Auto Document Feeder (ADF).

The software programs 2 are executed on an operating system (OS) such as UNIX (registered trade mark). The software programs 2 may be classified into the application layer 5, the platform layer 6, and others (not shown). The application layer 5 includes a printer application 9, a copier application 10, a facsimile application 11, and a scanner application 12, each of which performs a specific user service related to image forming.

The platform layer 6 includes a control service layer 7, a system resource manager (SRM) 21, and a handler layer 8. The control service layer 7 interprets a request for processing data from the application layer 5, and issues a request for allocating the hardware resources 4. The SRM 21 manages one or more hardware resources 4, and arbitrates requests for allocating the hardware resources 4 from the control service layer 7. The handler layer 8 handles the hardware resources 4 in response to a request for allocating the hardware resources 4 from SRM 21.

The control service layer 7 includes one or more service modules as follows: a network control service (NCS) 13, a remote service (RS) 14, an operations panel control service (OCS) 15, a facsimile control service (FCS) 16, an engine control service (ECS) 17, a memory control service (MCS) 18, an on-demand update service (OUS) 19, and a system control service (SCS) 20.

The platform layer 6 includes an application program interface (API) 28 that accepts predetermined functions each indicating a request for processing data from the application layer 5. Software programs of the application layer 5 and the platform layer 6 may be simultaneously executed on an operating system (OS) as processes.

The process of the NCS 13 corresponding to a communication unit provides a common service available for all application programs that require network interface. The process of the NCS 13 receives data from another resource connected to a network in compliance with various protocols, and transfers the received data to a designated application program, and vice versa.

The NCS 13 communicates with another network apparatus via a network using a HyperText Transfer Protocol Daemon (Httpd) in compliance with the HyperText Transfer Protocol (HTTP).

The process of the RS 14 provides the application layer 5 with services using a network such as the Internet.

The process of the OCS 15 controls an operations panel through with the operator and the system communicate.

The process of the FCS 16 provides the application layer 5 with the application program interface (API) 28 for exchanging facsimile data via PSTN and/or ISDN, registering and referring to facsimile data stored in memory for back-up. The process of the FCS 16 further provides the application layer 5 with the API 28 for reading or printing the facsimile documents.

The process of the ECS 17 controls engine units of the scanner 25, the plotter 26, and the other hardware resources 24.

The process of the MCS 18 manages memory (storage) such as the HDD by reserving and/or releasing a memory region.

The process of the OUS 19 corresponding to an update program acquiring unit downloads programs via the network, and stores the downloaded programs in the memory.

The process of the SCS 20 manages the application programs, controls the operations unit, displays system screens, indicates information via LEDs, manages the hardware resources, and controls interrupt applications, for example.

The process of the SRM 21 controls the system and manages the hardware resources 4 in cooperation with the SCS 20. The process of the SRM 21 arbitrates requests for allocating the hardware resources 4 such as the scanner 25 and the plotter 26 from the upper rank layer thereby to control the use of the hardware resources 4.

Specifically, the process of the SRM 21 determines whether the hardware resource 4 that is requested to be allocated is allocable (not being used by another process), and informs the upper rank layer, if usable, that the requested hardware resource 4 is usable. Additionally, the process of the SRM 21 schedules the use of the hardware resources 4 in response to requests from the upper rank layer, and performs requests such as paper transport and image forming by the printer engine, memory reservation, and file creation.

The handler layer 8 includes a facsimile control unit handler (FCUH) 22 and an image memory handler (IMH) 23. The FCUH 22 manages a facsimile control unit (FCU) described below. The IMH 23 manages the allocation of memory to processes and the allocated memory. The SRM 21 and the FCUH 22 give instructions to the hardware resources 4 by calling predetermined functions that are accepted by an engine interface (I/F) 27.

The platform layer 6 of the MFP 1 can provide all application programs with commonly-used processing services. The hardware structure of the MFP 1 is described below.

Figure 2:
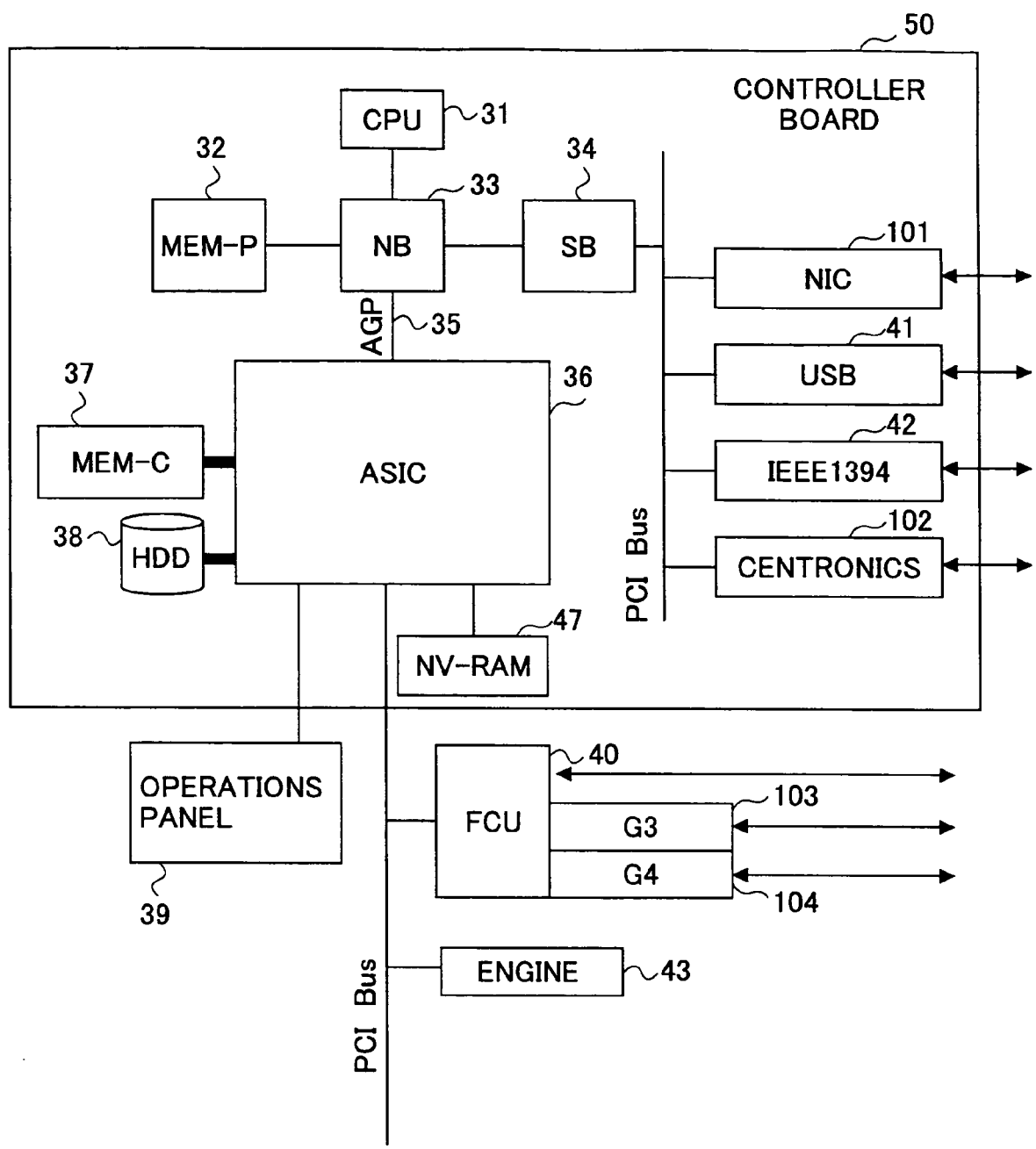
FIG. 2 is a block diagram showing the hardware structure of the image forming apparatus according to the embodiment.

FIG. 2 shows the hardware structure of the MFP 1 according to the first embodiment. The MFP 1 includes a controller board 50, an operations panel 39, the FCU 40, and an engine 43. The FCU 40 further includes a unit 103 supporting the G3 standard and a unit 104 supporting the G4 standard.

The controller board 50 includes a CPU 31, an ASIC 36, an HDD 38, a system memory (MEM-P) 32, a local memory (MEM-C) 37, a north bridge (NB) 33, a south bridge (SB) 34, a network interface card (NIC) 101, a USB device 41, an IEEE 1394 device 42, a Centronics device 102, and an MLB 45 (not shown).

The operations panel 39 is connected to the ASIC 36 of the controller board 50, and is further connected to the SB 34, the NIC 101, the USB device 41, the IEEE 1394 device 42, the Centronics device 102 and the NB 33 via a PCI bus.

The MLB 45 is a board that is connected to the MFP 1 via the PCI bus. The MLB 45 converts image data received from the MFP 1, and outputs the converted (or encoded) image data to the MFP 1.

The FCU 40 and the engine 43 are connected to the ASIC 36 of the controller board 50 via the PCI bus.

The local memory 37 and the HDD 38 are connected directly to the ASIC 36, and the ASIC 36 is connected to the CPU 31 via the CPU chipset NB 33. Since the ASIC 36 is connected to the CPU 31 via the NB 33 of which interface is publicly known, the interface of the CPU 31 does not matter even if the information of the CPU 31 interface is not released.

The ASIC 36 and the NB 33 are connected to each other via an Accelerated Graphics Port (AGP) 35, instead of a PCI bus. According to this arrangement, since the AGP 35 is much faster than the PCI bus, a plurality of processes of the application layer 5 and the platform layer 6 can be executed without degrading their performance.

The CPU 31 controls the entire system of the MFP 1. The CPU 31 executes NCS 13, RS 14, OCS 15, FCS 16, ECS 17, MCS 18, OUS 19, SCS 20, SRM 21, FCUH 22, and IMH 23 of the platform layer 6 as processes on the operating system, and further executes the printer application 9, the copier application 10, the facsimile application 11, and the scanner application 12 of the application layer 5.

The NB 33 is a bridge that connects the CPU 31, the system memory 32, the SB 34, and the ASIC 36 with one another. The system memory 32 is memory used for image forming. The SB 34 is a bridge that connects the NB 33, the PCI bus, and other peripheral devices. The local memory 37 is used as a copier image buffer and a code buffer.

The ASIC 36 is an application specific integrated circuit including various hardware elements for image forming. The HDD 38 is a storage device in which images, programs, font data, and forms, for example, are stored. The operations panel 39 is an operations unit through which a user can input instructions and can know the state of the MFP 1.

Figure 3:
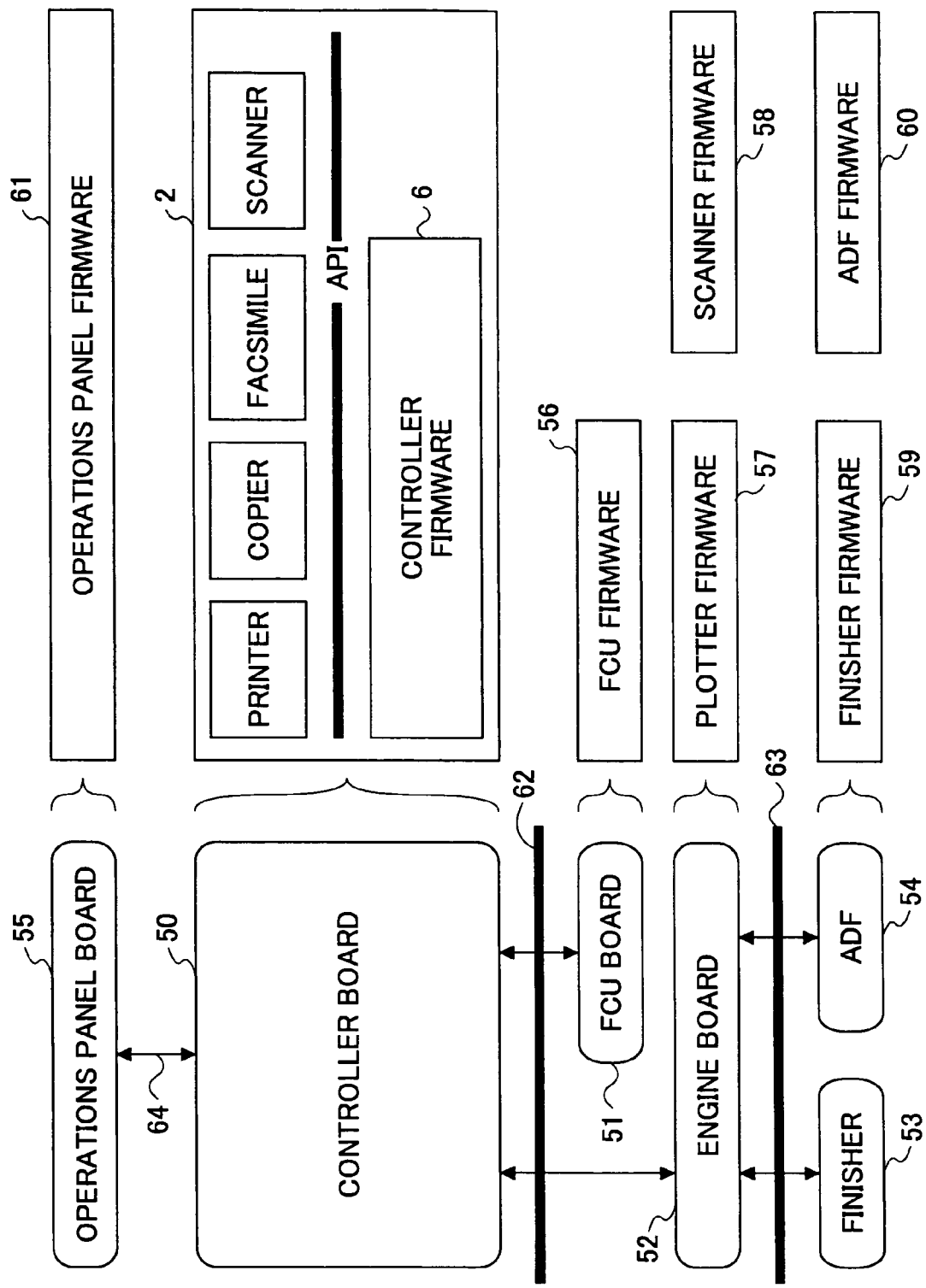
FIG. 3 is a schematic diagram showing processing units and corresponding programs according to the embodiment.

Referring to FIG. 3, the relationship between the processing units and the programs of the MFP 1 is described. FIG. 3 is a schematic diagram showing the relationship between the processing units and the firmware programs provided to the processing units. FIG. 3 shows the controller board 50, the operations panel board 55, the FCU board 51, the engine board 52, the finisher 53, and the ADF 54. The controller board 50 corresponds to a control unit, and the operations panel board 55, the FCU board 51, the engine board 52, the finisher 53, and the ADF 54 correspond to processing units. FIG. 3 also shows the following: the firmware programs 2 of the controller board 50, operations panel firmware 61 of the operations panel board 55, FCU firmware 56 of the FCU board 51, plotter firmware 57 and scanner firmware 58 that are installed in the engine board 52, finisher firmware 59 of the finisher 53, and ADF firmware 60 of the ADF 54.

The controller board 50 is described below. The controller board 50 executes the firmware programs 2 shown in FIG. 3. The controller board 50 controls the entire system of the MFP 1. The following boards are connected to the controller board 50.

The operations panel board 55 is a board that controls the operations panel 39. The operations panel board 55 displays information with which the operator can operate the MFP 1. The operations panel board 55 and the controller board 50 are connected to each other via a synchronous serial channel 64 for exchanging data.

The FCU board 51 is a facsimile control unit described above. The FCU board 51 and the controller board 50 are communicatively connected to each other via the PCI bus 62.

The firmware programs such as the plotter firmware 57 and the scanner firmware 58 are installed in the engine board 52. The engine board 52 is also communicatively connected to the controller board 50 via the PCI bus 62.

The operations panel board 55, the FCU board 51, and the engine board 52 communicate with the controller board 50 directly. On the other hand, the finisher 53 and the ADF 54 described below communicate with the controller board 50 indirectly via the engine board 52 that is connected through a serial channel 63. The finisher 53 is a device that staples printed paper that is controlled by the finisher firmware 59. The ADF 54 is a device for automatically feeding documents that is controlled by the ADF firmware 60.

Each of the operations panel board 55, the FCU board 51, the engine board 52, the finisher 53, and the ADF 54 has a CPU thereon.

As described above, the MFP 1 has one or more processing units related to image forming, a control unit that communicates with each one of the processing units directly, or indirectly via another one of processing units, and programs that are executed by the processing units and the control unit.

Figure 4:
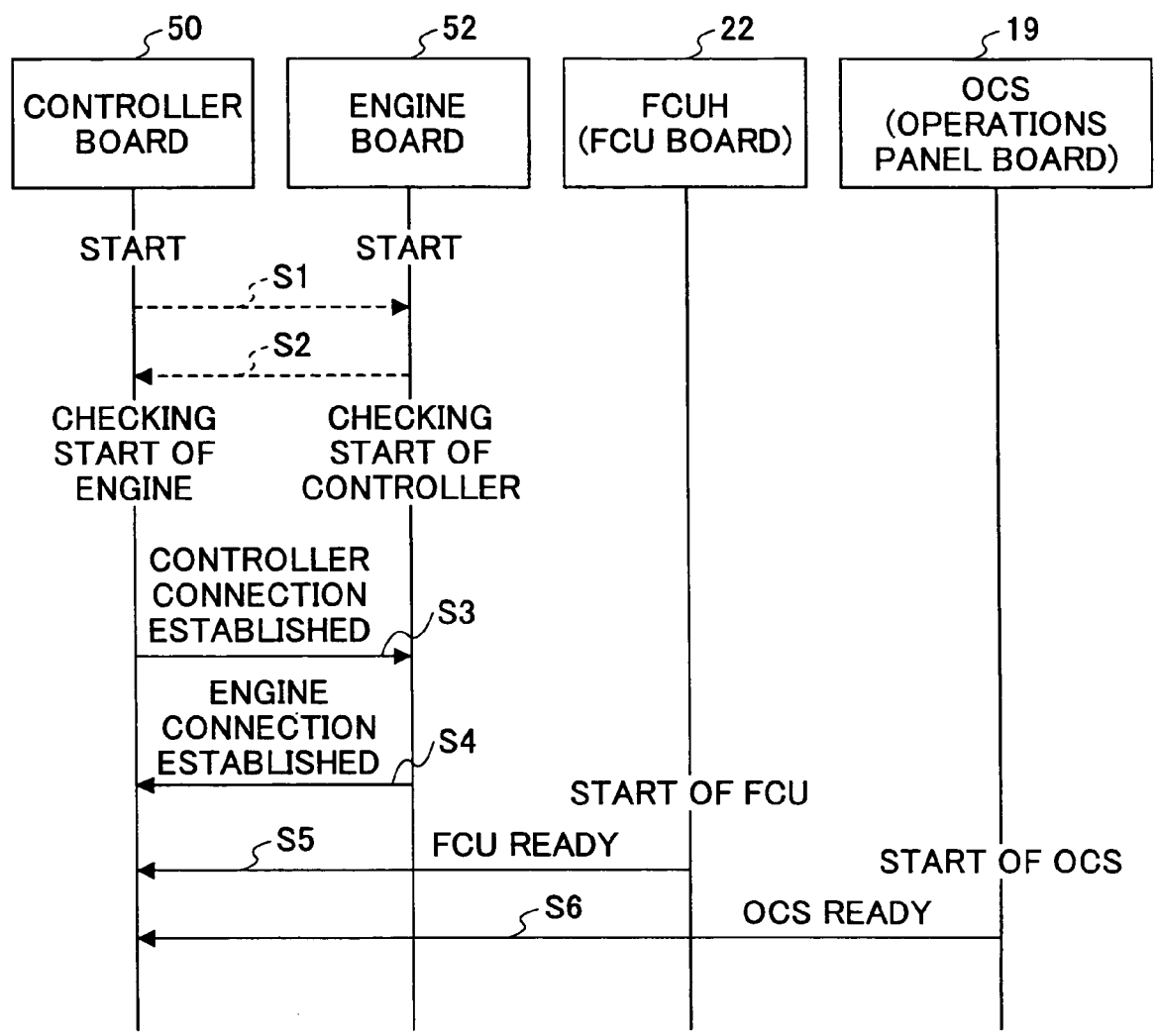
FIG. 4 is a sequence chart showing the activation of the processing units according to the embodiment.

Referring to FIG. 4, a description is given next about an operation in which boards are started. FIG. 4 is a sequence chart showing the operation of the controller board 50, the engine board 52, the FCUH 22 (the FCU board 51), and the OCS 19 (the operations panel board 55). The FCUH 22 controls the start of the FCU board 51, and the OCS 19 controls the start of the operations panel board 55.

In steps S1 and S2, the controller board 50 and the engine board 52 determine whether they are mutually in communication. In step S3, the controller board 50 informs the engine board 52 that the controller board 50 is connected to the engine board 52. In step S4, the engine board 52 informs the controller board 50 that the engine board 52 is connected to the controller board 50. The engine board 52 transmits information related to the programs installed in the engine board 52 at the same time.

In step S5, after the FCUH 22 determines that the FCU board 51 has been started, the FCUH 22 informs the controller board 50 that the FCU board 51 has been started, and provides information related to the programs installed in the FCU board 51. Likewise, in step S6, after the operations panel board 55 has been started, the OCS 19 informs the controller board 50 that the operations panel board 55 has been started, and information related to the programs installed in the operations panel board 55.

A description is given next about the process in which programs are updated.

The programs of the above processing units are updated in response to instructions of the SCS 20 of the controller board 50. A description is given about the update of the programs executed on the controller board 50 first.

The application programs 9, 10, 11, and 12 installed in the controller board 50 and the program of the controller firmware 6 (shown in FIG. 1) can be individually updated.

In an ordinary state (a state in which all programs are updated), the programs of the controller firmware 6 are programs stored in the NV-RAM 47 (hereinafter referred to as primary programs). The primary programs that are being executing cannot be updated while the primary programs are executed, otherwise the ordinary operations of the MFP 1 may be suspended. When the primary programs stored in the NV-RAM 47 need to be updated, the MFP 1 needs programs other than the primary programs to keep it in operation. The primary programs may be copied to RAM such as the local memory 37 and/or the system memory 32, and the copied primary programs may be executed while the original primary programs stored in the NV-RAM are being updated. According to such arrangements, the MFP 1 can continue to operate even while the primary programs stored in the NV-RAM are being updated.

Figure 5:
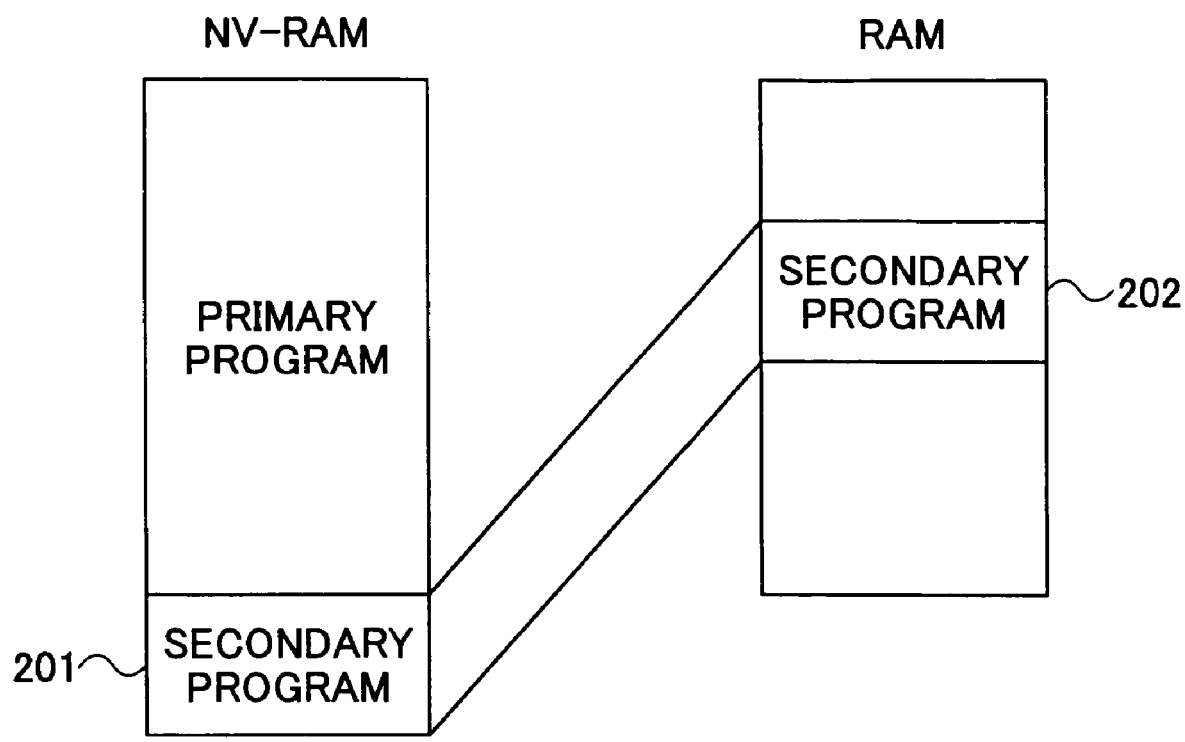
FIG. 5 is a schematic diagram showing the loading of programs for update from NV-RAM to RAM according to the embodiment.

However, RAM capacity is not large enough to fully load the primary programs. According to this limitation in RAM capacity, other programs that are shorter than the primary programs are stored in the NV-RAM in advance (hereinafter the other programs may be referred to as secondary programs). The secondary programs, instead of the primary programs, stored in the NV-RAM are loaded into the RAM. While the primary programs stored in the NV-RAM are being executed, the MFP 1 can execute the copied secondary programs and continue to operate. FIG. 5 shows that one of the secondary programs 201 is loaded into the RAM. As shown in FIG. 5, the secondary program 201 stored in the NV-RAM is loaded into the RAM so that the secondary program 202 loaded in the RAM can be executed (used) during the update.

The difference between the secondary programs and the primary programs is described below.

Figure 6:
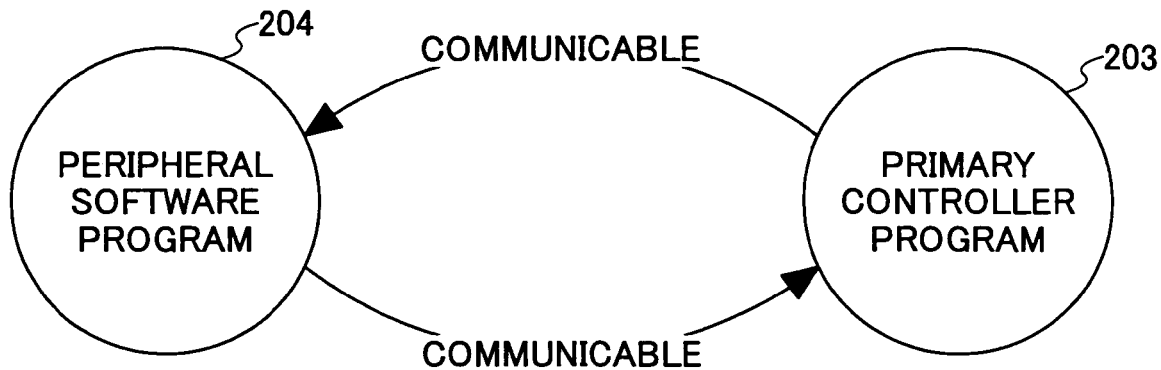
FIG. 6 is a schematic diagram showing the communications between a peripheral program and a controller program in an ordinary state according to the embodiment.

Each one of the primary programs of the controller firmware 6 includes a portion for communicating with a plurality of firmware programs of processing units. FIG. 6 shows that the primary program of the controller firmware 203 and peripheral software program 204 are in communication. The peripheral software program 204 is, for example, the FCU firmware 56 and the plotter firmware 57.

Because the controller board 50 needs to control the processing units, the controller firmware 6 installed in the controller board 50 includes a large portion for communicating with the peripheral software programs.

The secondary program does not include the large portion for communicating with the peripheral software. Accordingly, the secondary program is smaller in size than the primary program.

Figure 7:
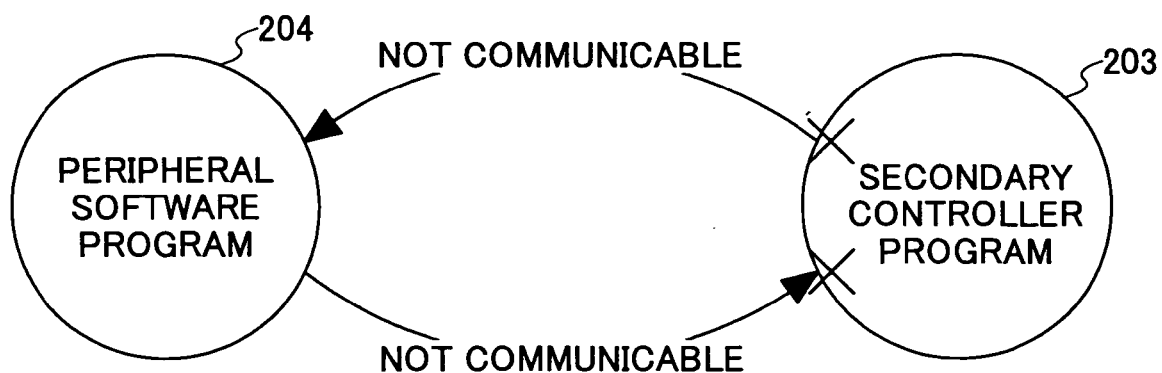
FIG. 7 is a schematic diagram showing the communications between a peripheral program and the program for update according to the embodiment.

Since the secondary program does not include the large portion for communicating with the processing units, the secondary program cannot communicate with the peripheral software. However, the secondary program occupies a smaller region of the RAM. FIG. 7 shows that the secondary program of the controller firmware 203 running on the controller board 50 and the peripheral software programs 204 cannot communicate with each other.

As described above, while the primary program of the controller firmware 6 is being updated and the secondary program of the controller firmware 6 is being executed, the controller firmware 6 (the controller board 50) cannot communicate with the peripheral software programs (the FCU board, for example). Accordingly, the controller firmware 6 cannot update the peripheral software programs.

The above problem is common to the engine board 52 that communicates with the finisher 53 and the ADF 54. The finisher 53 and the ADF 54 update their firmware in response to receipt of an instruction from the engine board 52. While the firmware programs of the engine board 52 are being updated, the firmware programs of the engine board 52 cannot communicate with the firmware programs of the finisher 53 and the ADF 54. Accordingly, the firmware programs of the finisher 53 and the ADF 54 cannot be updated.

To solve the above problems, the more processing units a first processing unit communicates with the control unit through, the earlier the first processing unit needs to be updated. That is, if a first processing unit needs to communicate with the control unit through more processing units than a second processing unit needs to communicate with control unit, the firmware of the first processing unit needs to be updated before the firmware of the second processing unit is updated.

Referring to FIG. 8, priority information for determining the order in which the peripheral software programs are updated is described. The priority information shown in FIG. 8 is a table indicating program names and the priority in which the programs are updated. The program names are the "FCU firmware", the "finisher firmware", and the "printer application", for example.

FIG. 8 shows that the program C is to be updated second, and the program E is to be updated tenth. A program of which "priority" is smaller is updated earlier. Accordingly, program A is updated before program D is updated. If two programs has the same priority, either one may be updated earlier.

The priority information is determined based on the number of processing units through which each processing unit communicates with the controller board 50. In the case shown in FIG. 3, the priorities of the finisher firmware 59 and the ADF firmware 60 are "1" since they communicate with the controller firmware programs 6 through the firmware of the engine board 52.

Update order information including the order in which the peripheral software programs are updated using an acquired update program and the process of creating the update order information are described below.

FIG. 9 is a schematic diagram showing the process of creating the update order information. An assumption is made that the update program includes individual update programs E, F, D, and A in this order.

The controller firmware 6 creates a priority table 70 indicating the individual update programs and their priorities based on the priority information. The priority table 70 is sorted in increasing order into the update order information 71. The update order information 71 is information that correlates the names of programs that are to be updated by the acquired update program with the order in which the programs are updated.

The update order information 71 may be extended. FIG. 10 shows extended update order information 71. FIG. 10 shows that the extended update order information 71 includes versions of the programs and status. The status is either "not yet executed", "executing" and "executed". The status "not yet executed" indicates the program is not yet updated. The status "executing" indicates that the program is being updated. The status "executed" indicates that the program has been updated. As described above, the status indicates whether the program has been updated.

Figure 11:
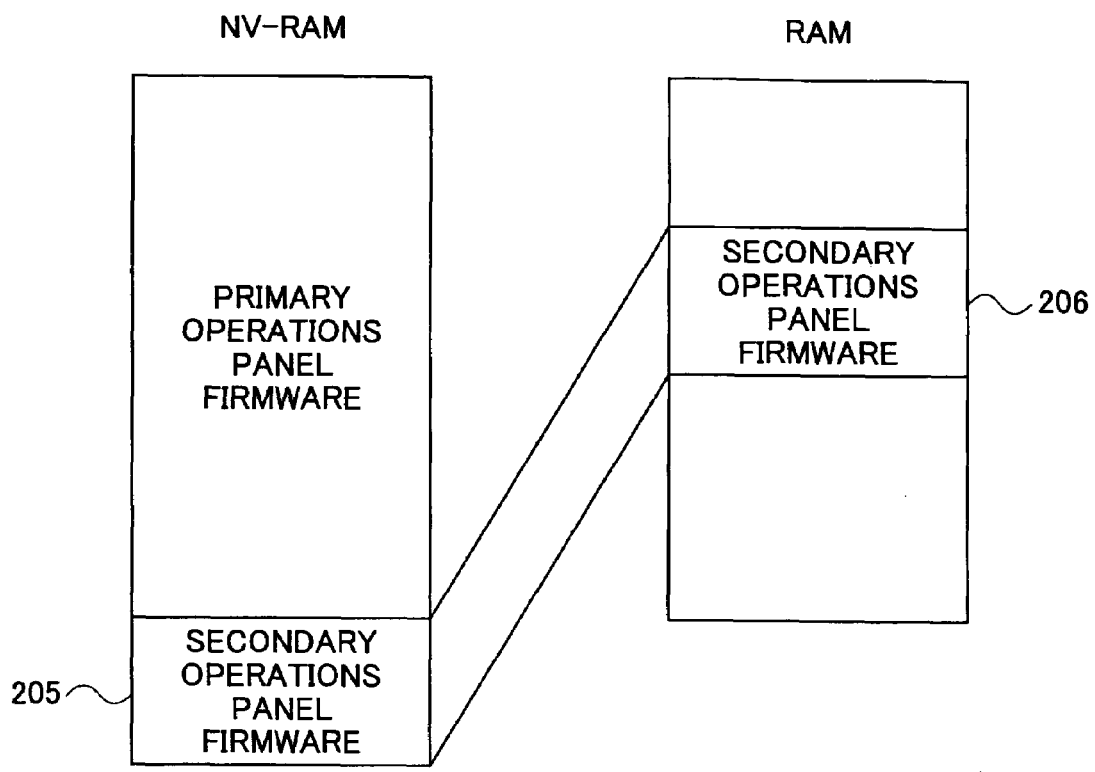
FIG. 11 is a schematic diagram showing the loading of a program for update from NV-RAM to RAM.

It is noted that the controller firmware 6 is to be updated before the operations panel firmware 61 is updated because the operations panel firmware 61 needs to display the proceeding of the update for the operator. FIG. 11 is a schematic diagram showing secondary operations panel firmware 206 copied from the NV-RAM in which primary operations panel firmware is stored.

Since the operations panel firmware 61 is updated after the controller firmware 6 is updated, the secondary controller firmware 6 needs to include a portion for communicating with the operations panel firmware 61. If the operations panel firmware 61 does not need to display the proceeding, however, the operations panel firmware 61 may be updated in the order in which the other peripheral software programs are updated.

Figure 12:
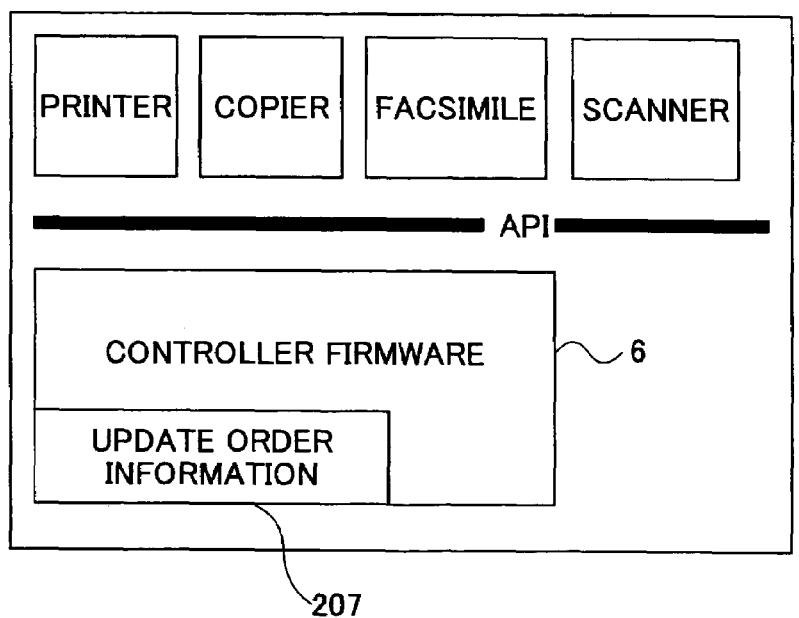
FIG. 12 is a schematic diagram showing the position of the update order information in the software structure according to the embodiment.

The update order information is retained by the SCS 20 of the controller firmware 6. FIG. 12 is a schematic diagram showing the position of the update order information in the controller firmware 6. As shown in FIG. 12, the update order information 207 is retained by the controller firmware 6.

Figure 13:
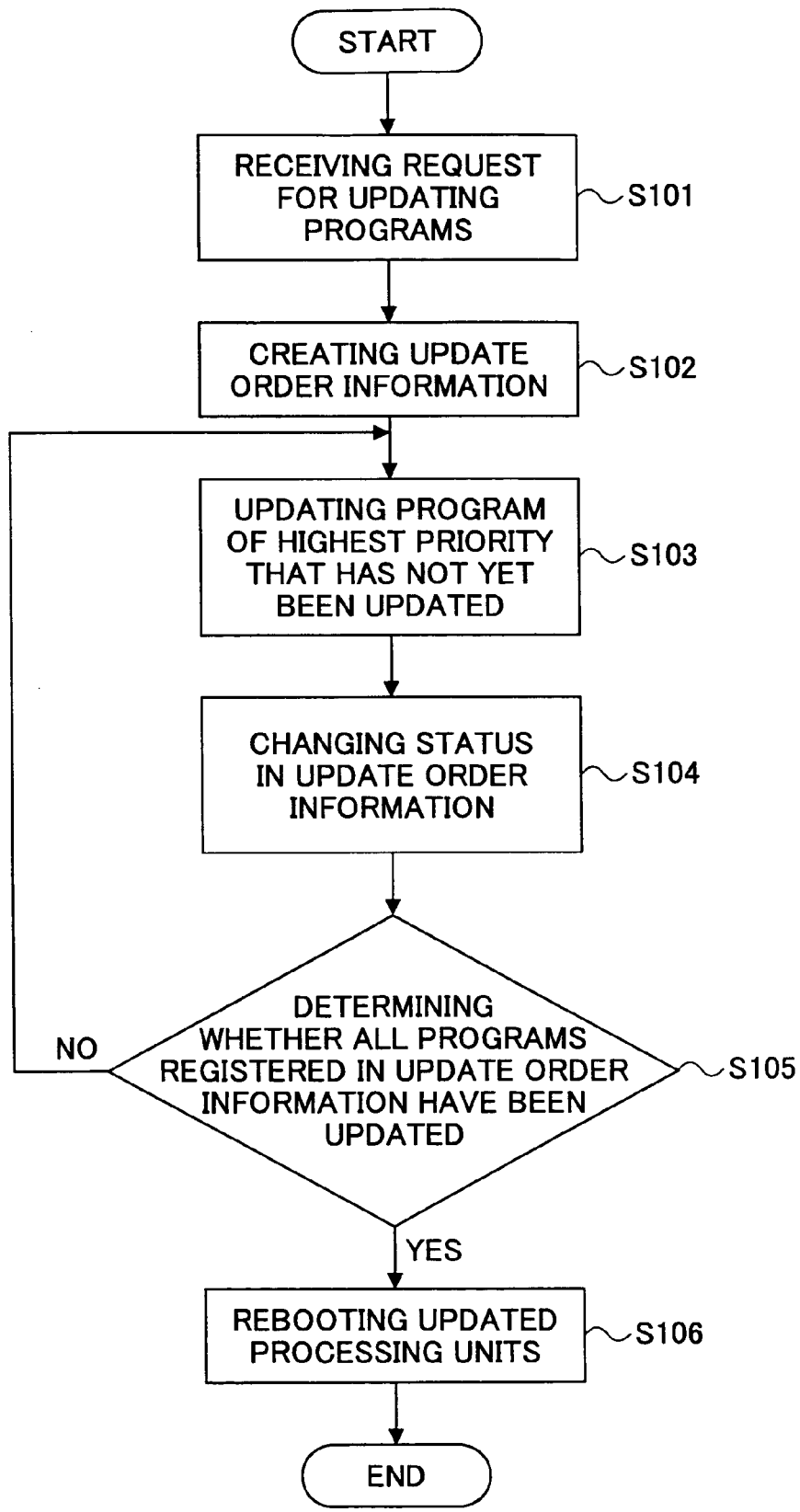
FIG. 13 is a flowchart showing update processing of a program according to the embodiment.

Referring to FIG. 13, the update process of the programs of the MFP 1 is described in detail.

In step S101, the SCS 20 of the controller firmware 6 receives a request for starting the update of the programs from the OUS 19 that has received the update program via the network. Step S101 corresponds to the step of acquiring the update program. In step S102, the controller firmware 6 creates the update order information based on the priority information and the updated program loaded in the RAM.

In step S103, the controller firmware 6 updates the program that is not yet updated of which priority is the highest. Step S103 corresponds to the step of updating the programs. In step S104, the controller firmware 6 changes the status in the update order information from "not yet executed" to "currently executing" and, when the update is completed, from "currently executing" to "executed".

In step S105, the controller firmware 6 determines whether all programs registered in the update order information have been updated. If all programs have not yet been updated, processing of step S103 and S104 is performed again. If all programs have been updated, in step S106, the controller firmware 6 reboots the processing units of which peripheral software programs have been updated. Processing then ends.

A description is given about the reboot process of the processing units of which programs have been updated. A processing unit (board) may be categorized into two types, direct-reboot type and self-reboot type. The direct-reboot type board can be directly rebooted by the controller board 50. The self-reboot type board automatically reboots itself in response to a request from the controller board 50. The reboot process is described below.

Figure 14:
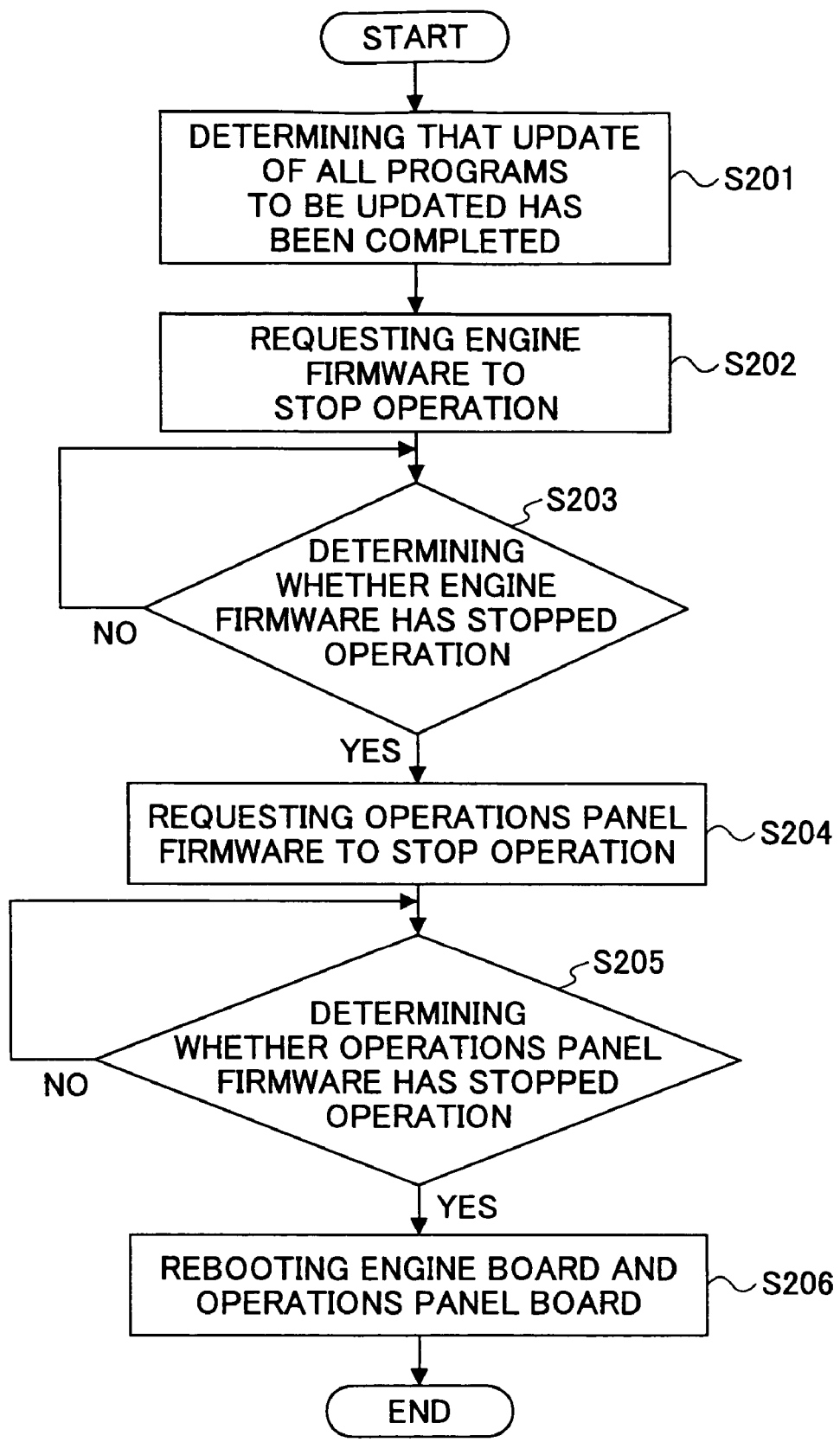
FIG. 14 is a flowchart showing update processing in which a board is directly rebooted according to the embodiment.

Referring to FIG. 14, the reboot process of the direct-reboot type board is described below. An assumption is made herein that both the engine board 52 and the operations panel board 55 are direct-reboot type. In step S201, the controller firmware 6 completes the update of all firmware programs of the processing units to be updated. In step S202, the controller firmware 6 requests the engine firmware to stop operation so that, when the engine board 52 is rebooted, the engine board 52 does not malfunction.

In step S203, the controller firmware waits for the engine firmware's response that the engine firmware has stopped its operation. In step S204, the controller firmware 6 requests the operations panel firmware to stop its operation. In step S205, the controller firmware 6 further waits for the operations panel firmware's response that the operations panel firmware has stopped its operation.

In step S206, when the controller firmware 6 is informed by the operations panel firmware that the operations panel firmware has stopped its operation, the controller firmware 6 reboots both the engine board 52 and the operations panel board 55 that are directly re-bootable (can be rebooted).

As described above, the controller firmware 6, before rebooting the direct-reboot type boards, requests them to stop their operation.

Figure 15:
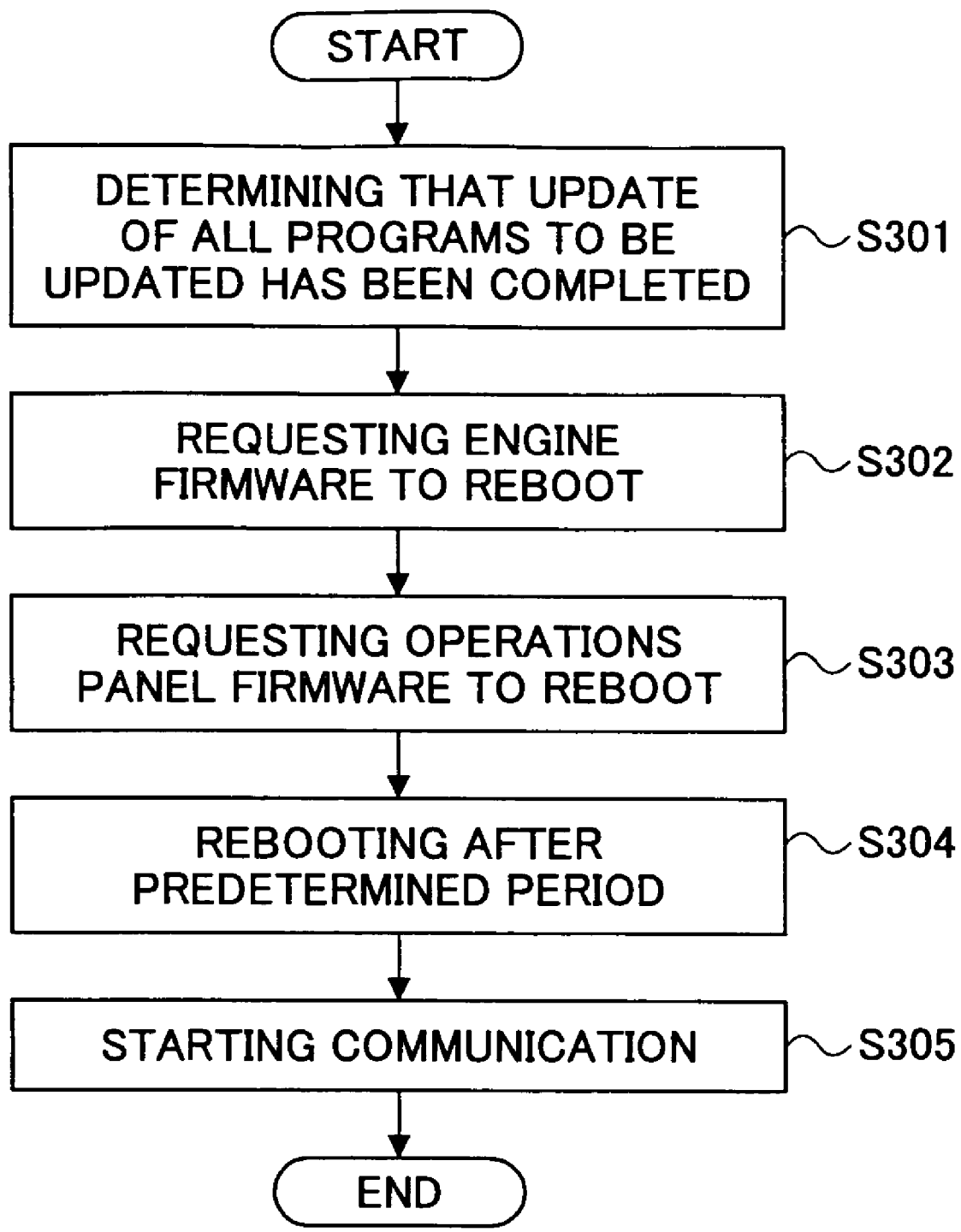
FIG. 15 is a flowchart showing update processing in which a board is rebooted in response to a reboot request according to the embodiment.

Referring to FIG. 15, the reboot process of the self-reboot type boards is described below. An assumption is made herein that both the engine board 52 and the operations panel board 55 are self-reboot types. In step S301, the controller firmware determines that the update of all programs of the processing units to be updated has been completed. In step S302, the controller firmware 6 requests the engine firmware to reboot itself. In step S303, the controller firmware 6 requests the operations panel firmware to reboot the operations panel board 55. After a predetermined period, in step S304, the controller firmware 6 reboots the controller board 50. After rebooting, in step S305, the controller firmware 6 starts communicating with the engine firmware and the operations panel firmware that have already rebooted corresponding boards.

As described above, the controller firmware 6 requests the self-reboot type boards to reboot themselves, and then, after a predetermined period, the controller firmware 6 reboots itself.

Figure 16:
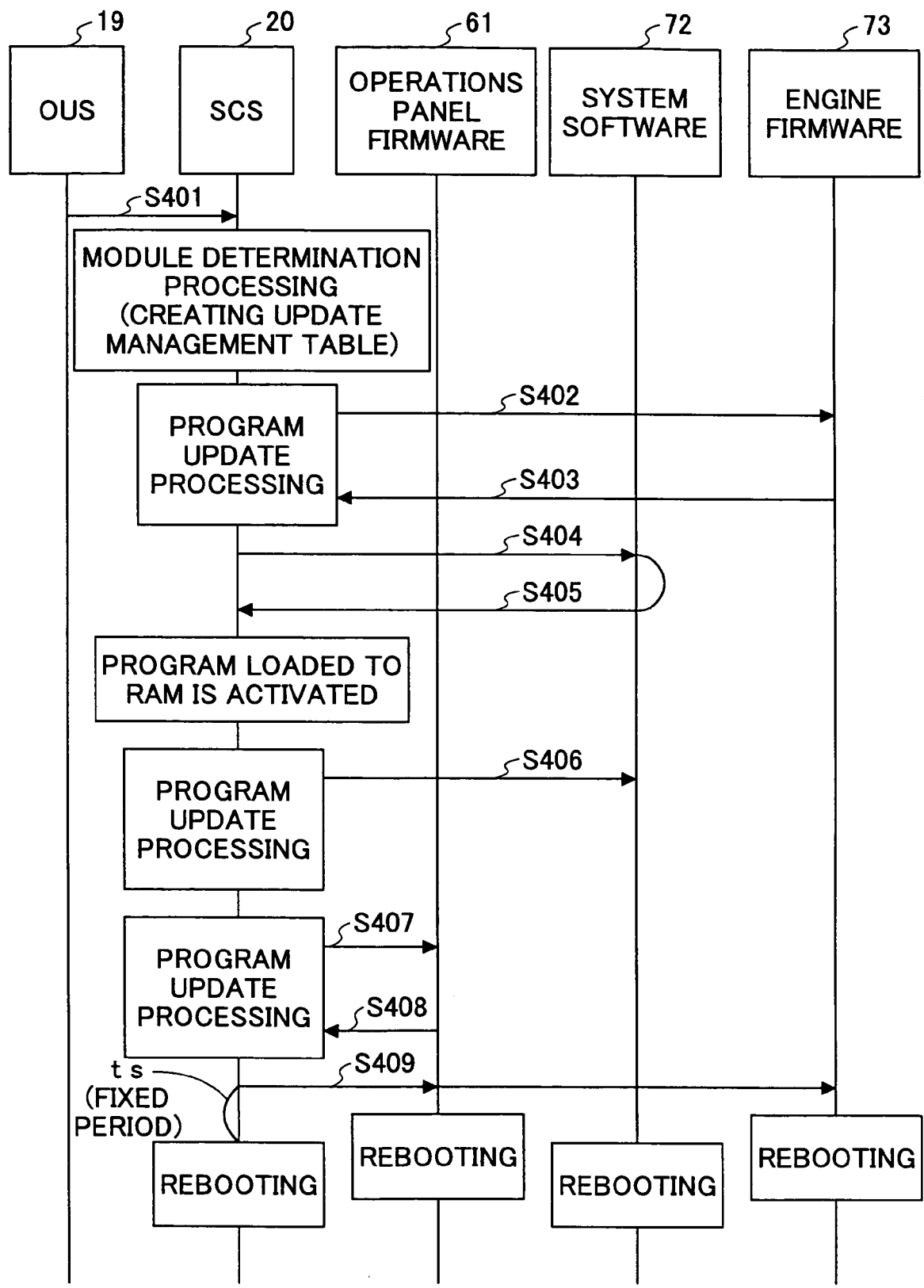
FIG. 16 is a sequence chart showing a process in which updated programs are rebooted after all programs are updated according to the embodiment.

Referring to the sequence chart of FIG. 16, the process shown in the above flowcharts is described in further detail. This sequence chart shows the OUS 19, the SCS 20, the operations panel firmware 61, a system software 72, and the engine firmware 73 that exchange signals and data. The system software 72 includes programs of the controller 6 and the application layer 5. The engine firmware 73 is either the plotter firmware 57 or the scanner firmware 58 that are installed in the engine board 52.

In step S401, the OUS 19 of the controller 6 informs the SCS 20 of the same controller 6 that the OUS 19 has downloaded the update program. Step S401 corresponds to the step of acquiring the update program. In response to receipt of the information, the SCS 20 performs module determination processing thereby to create an update management table. The update management table is described below. After creating the update management table, in step S402, the SCS 20 transmits the individual update program to the engine firmware 73. Step S402 corresponds to the step of updating the program. When the engine firmware 73 completes updating itself, in step S403, the engine firmware 73 informs the SCS 20 whether the engine firmware 73 has successfully updated itself.

In step S404, the SCS 20 request the system software 72 other than the SCS 20 to prepare for reboot. When the preparation for reboot is completed, in step S405, the system software 72 informs the SCS 22 that the system software 72 has completed the preparation for reboot.

The primary program of the SCS 20 stored in the NV-RAM has been executing until this point in time. As described above referring to FIG. 5, the secondary program of the SCS 20 loaded in the RAM is activated. In step S406, the SCS 20 updates the system software 72. In step S407, the SCS 20 transmits the individual update program to the operations panel firmware 61. In step S408, the operations panel firmware 61 informs the SCS 20 whether the update has been successfully completed.

After completing the update of all programs, in step S409, the SCS 20 reboots the engine firmware 73 and the operations panel firmware 71. Step S409 corresponds to the step of rebooting. After a predetermined period (several seconds, for example), the SCS 20 reboots the system software 72.

Referring to FIG. 17, the update management table is described below. The table has columns such as "program name", "version", "module ID", and "status".

The module ID is an identification of the received individual update program. The status is the status of update described referring to FIG. 10.

The update management table shows that the version and the module ID of the scanner engine program are Ver. 1.22 and JP2CFa_escan, respectively, and the update of the scanner engine program has not yet executed.

Before describing the creation of the update management table, the table shown in FIG. 18 is described. The table of FIG. 18 shows the programs installed in the MFP 1.

The table of FIG. 18 has columns such as the program name, the version of the program, and the module ID of the program.

An assumption is made that the MFP 1 includes the programs listed in the table of FIG. 18, and the received update program includes the individual update program of the plotter engine program, the individual update program of the scanner engine program, the individual update program of the controller program, the individual update program of the printer application program, the individual update program of the facsimile application program, and the individual update program of the operations panel program.

In this case, the SCS 20 removes the copier application program in the table of FIG. 18, and ignores the individual update program of the facsimile application program in the received update program. As a result, the SCS 20 creates the update management table shown in FIG. 19.

Figure 20:
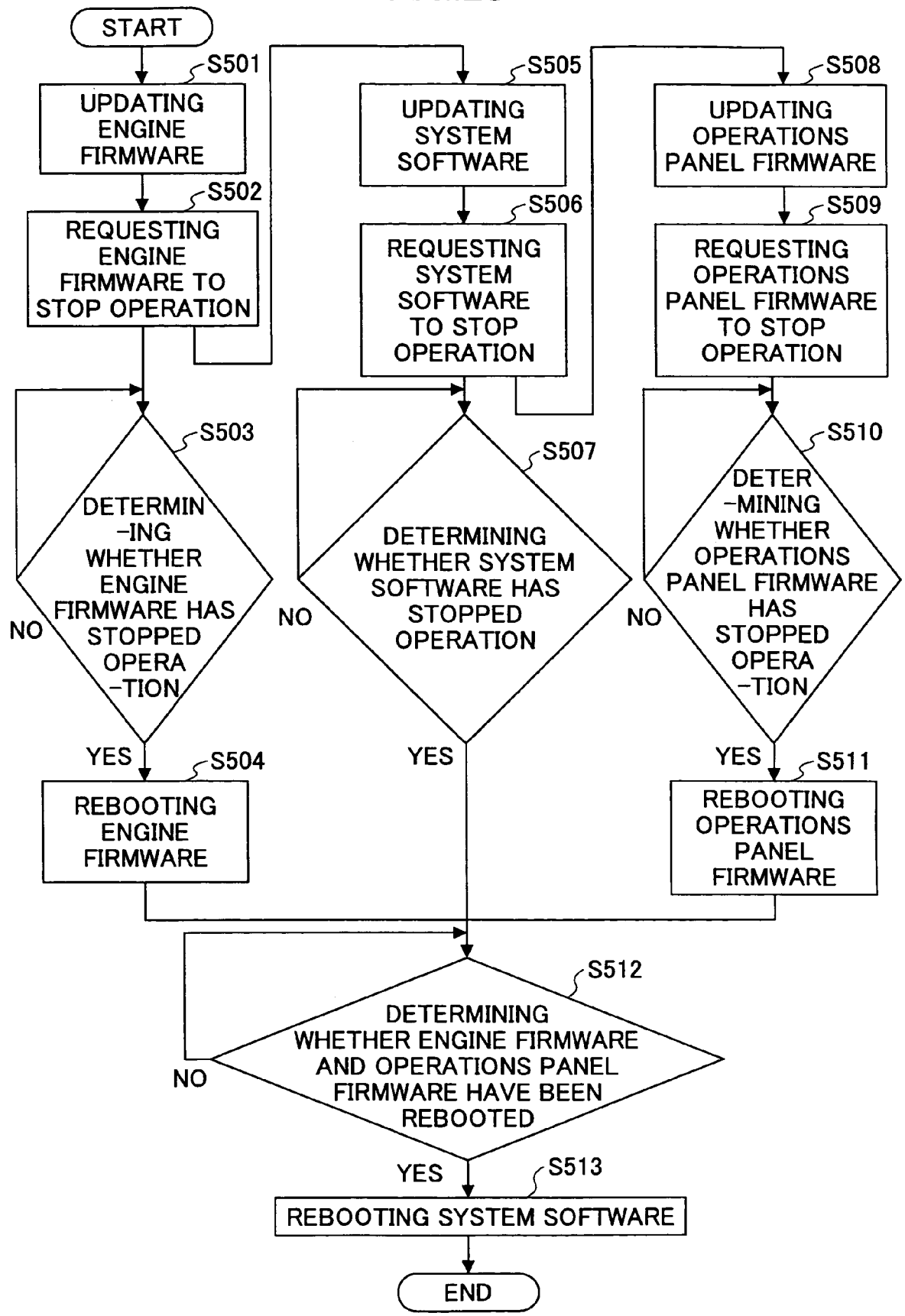
FIG. 20 is a flowchart showing a process in which updated programs are rebooted as soon as they are updated according to another embodiment.

Referring to the flowchart shown in FIG. 20, a reboot process is described in which the SCS 20 reboots processing units in the order in which the program is updated.

In step S501, the SCS 20 updates the engine firmware 73. Step S501 corresponds to the step of updating the program. In step S502, the SCS 20 requests the engine firmware 73 to stop its operation. In step S503, the SCS 20 waits for a response that the engine firmware 73 has stopped its operation. In response to the engine firmware's response, in step S504, the SCS 20 reboots the engine firmware 73, and proceeds to step S512. Step S504 corresponds to the step of rebooting.

After step S502, in step S505, the SCS 20 also updates the system software 72 in parallel. In step S506, the SCS 20 requests the programs of system software 72 other than the SCS 20 to stop their operations.

In step S507, the SCS 20 waits for the system software's response that the programs have stopped their operation. In response to the system software's response, the SCS 20 proceeds to step S512.

After requesting the programs of system software 72 to stop their operations in step S506, in step S508, the SCS 20 updates the operations panel firmware 61. In step S509, the SCS 20 requests the operations panel firmware 61 to stop its operation.

In step S510, the SCS 20 waits for the operations panel firmware's response that it has stopped its operation. In response to receipt of the operations panel firmware's response, in step S511, the SCS 20 reboots the operations panel firmware 61. Step S511 corresponds to the step of rebooting.

In step S512, the SCS 20 determines whether the reboot of the engine firmware 73 and the operations panel firmware 61 has been completed. If the determination is positive, in step S513, the SCS 20 reboots the system software 72. The process then ends.

Figure 21:
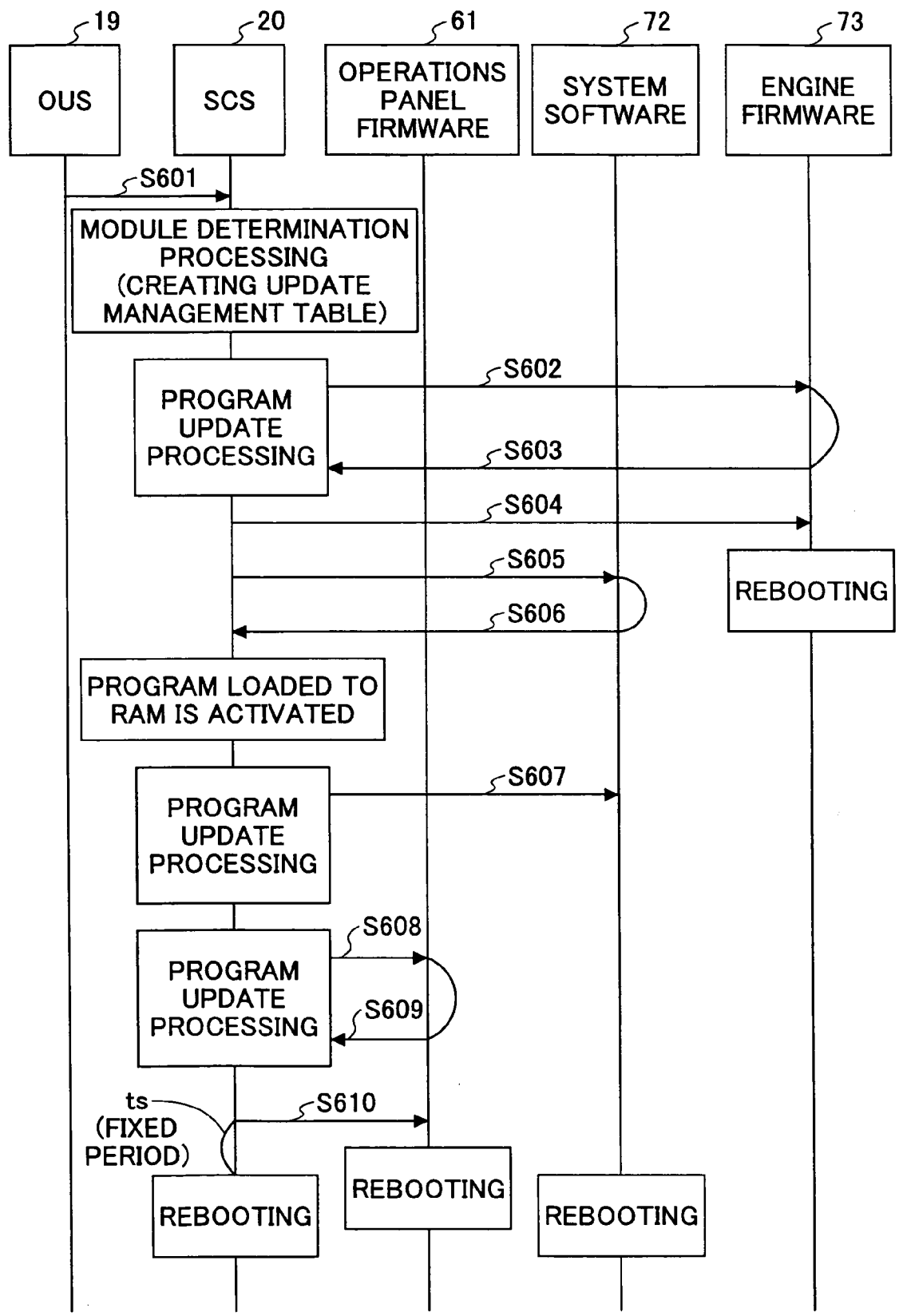
FIG. 21 is a sequence chart showing the process in which updated programs are rebooted as soon as they are updated according to the other embodiment.

Referring to the sequence chart of FIG. 21, the above process is further described. Similar to the sequence chart shown in FIG. 16, this sequence chart shows the exchange of signals among the OUS 19, the SCS 20, the operations panel firmware 61, the system software 72, and the engine firmware 73.

In step S601, the OUS 19 of the controller 6 informs the SCS 20 of the same controller 6 that the OUS 19 has downloaded the update program. Step S601 corresponds to the step of acquiring the update program. In response to receipt of the information, the SCS 20 performs the module determination processing thereby to create an update management table. After creating the update management table, in step S602, the SCS 20 transmits the individual update program to the engine firmware 73. Step S602 corresponds to the step of updating the program. When the engine firmware 73 completes updating itself, in step S603, the engine firmware 73 informs the SCS 20 whether the engine firmware 73 has successfully updated itself.

In response to receipt of the result of the update, in step S604, the SCS 20 requests the engine firmware 73 to reboot itself. Step S604 corresponds to the step of rebooting. The engine firmware 73 reboots itself.

In step S605, the SCS 20 requests the system software 72 other than the SCS 20 to prepare for reboot. When the preparation for reboot is completed, in step S606, the system software 72 informs the SCS 22 that the system software 72 has completed the preparation for reboot. As described above, the SCS 20 switches its operation from the primary program stored in the NV-RAM to the secondary program loaded to the RAM.

In step S607, the SCS 20 (the secondary SCS 20 program) updates the system software 72. In step S608, the SCS 20 transmits the individual update program to the operations panel firmware 61. In step S609, the operations panel firmware 61 informs the SCS 20 whether the update has been successfully completed.

In step S610 corresponding to the step of updating, the SCS 20 requests the operations panel firmware to reboot itself. The operations panel firmware 61 reboots itself.

The SCS 20 reboots the system software 72 in a predetermined period (several seconds, for example) after all programs are updated.

A description is made about a process in which the SCS 20 determines that the communication channel to the operations panel firmware 61 and the engine firmware 73 has been disconnected and, in response to the determination, reboots itself.

The determination of the communication channel means that the counterpart of the communication channel has rebooted itself. The SCS 20 can make sure that the counterpart of the communication channel has rebooted itself before the SCS 20 reboots itself.

Figure 22:
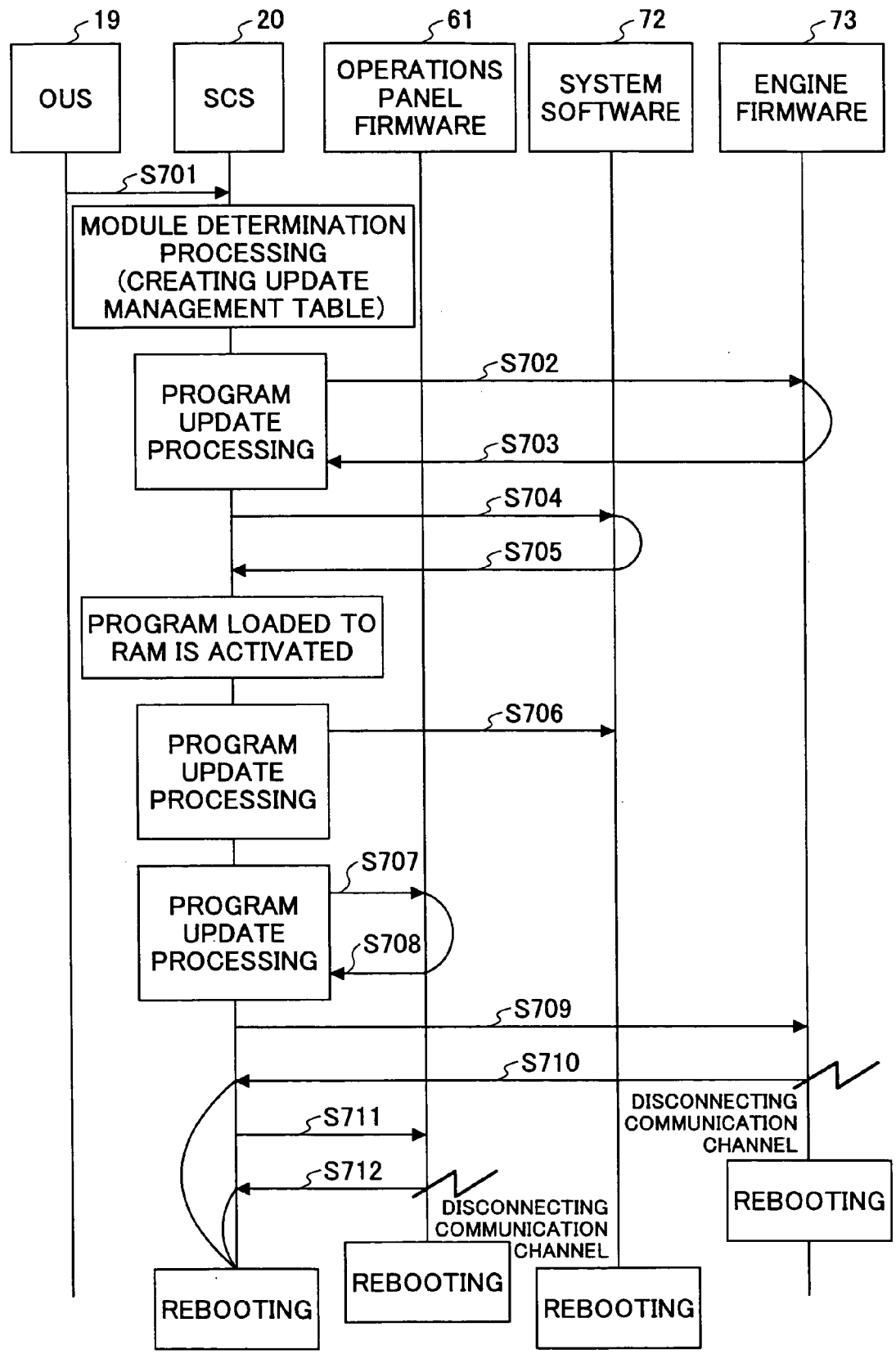
FIG. 22 is a sequence chart showing a process in which updated programs are rebooted after communication is disconnected according to yet another embodiment.

The above process is described below with reference to FIG. 22. In step S701 corresponding to the step of acquiring the update program, the OUS 19 informs the SCS 20 that the OUS 19 has downloaded the update program. In response to receipt of the information, the SCS 20 performs module determination processing thereby to create an update management table.

In step S702 corresponding to the step of updating the program, after creating the update management table, the SCS 20 transmits the individual update program to the engine firmware 73. In step S703, when the engine firmware 73 completes updating itself, the engine firmware 73 informs the SCS 20 whether the engine firmware 73 has successfully updated itself.

In step S704, the SCS 20 requests the system software 72 other than the SCS 20 to prepare for reboot. In step S705, when the preparation for reboot is completed, the system software 72 informs the SCS 22 that the system software 72 has completed the preparation for rebooting.

The SCS 20 switches its operation from the primary program stored in the NV-RAM to the secondary program loaded to the RAM. In step S707, the SCS 20 transmits the individual update program to the operations panel firmware 61. In step S708, the operations panel firmware 61 informs the SCS 20 whether the update has been successfully complete.

After all programs have been updated, the SCS 20 requests the engine firmware 73 to reboot itself in step S709 corresponding to the step of rebooting. According to this step, the SCS 20 confirms that the communication channel to the engine firmware 73 has been disconnected.

The SCS 20 requests the operations panel firmware 61 to reboot itself in step S711 corresponding to the step of rebooting. According to this step, the SCS 20 confirms that the communication channel to the operations panel firmware 61 has been disconnected.

Since the SCS 20 has confirmed that the engine firmware 73 and the operations panel firmware 61 have been rebooted, the SCS 20 reboots the system software 72.

A description is given of a method in which the programs are rebooted after all the programs are updated and a method in which each program is rebooted after the program is updated.

Figure 23:
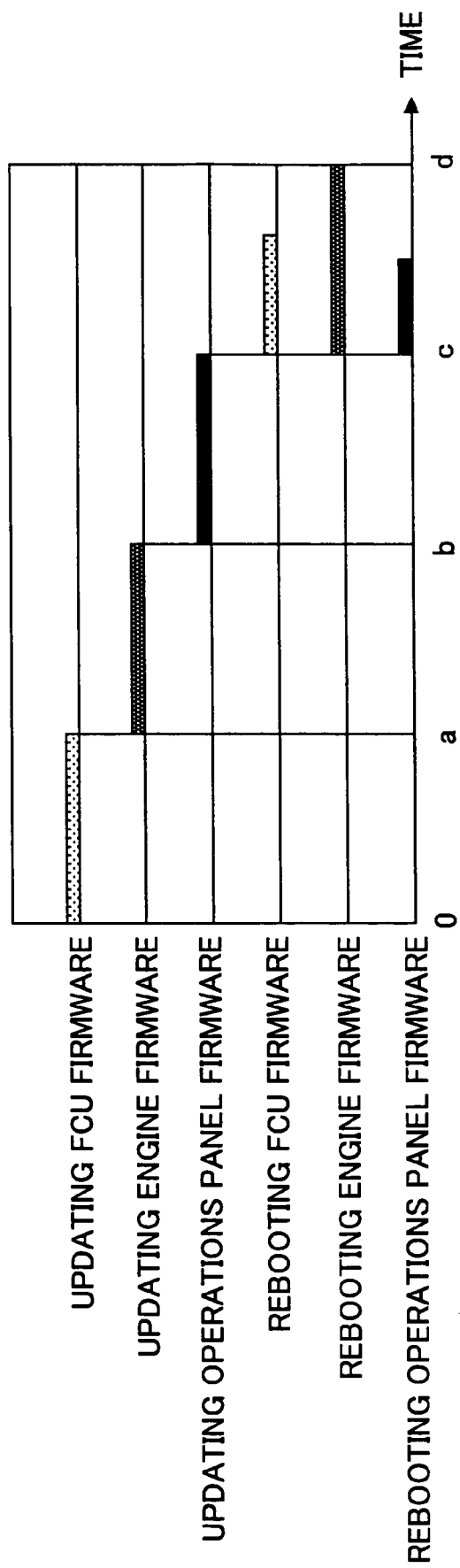
FIG. 23 is a schematic diagram for explaining time required for the process in which updated programs are rebooted after all programs are updated according to the embodiment.

The time required for the former method is different from the time required for the latter method. FIG. 23 illustrates the time required for the method in which the programs are rebooted after all the programs are updated.

FIG. 23 shows that the update process of the FCU firmware starting at time 0, the update process of the engine firmware starting at time "a", the update process of the operations panel firmware starting at time "b", and the reboot process of all firmware starting at time "c" and ending at time "d".

Figure 24:
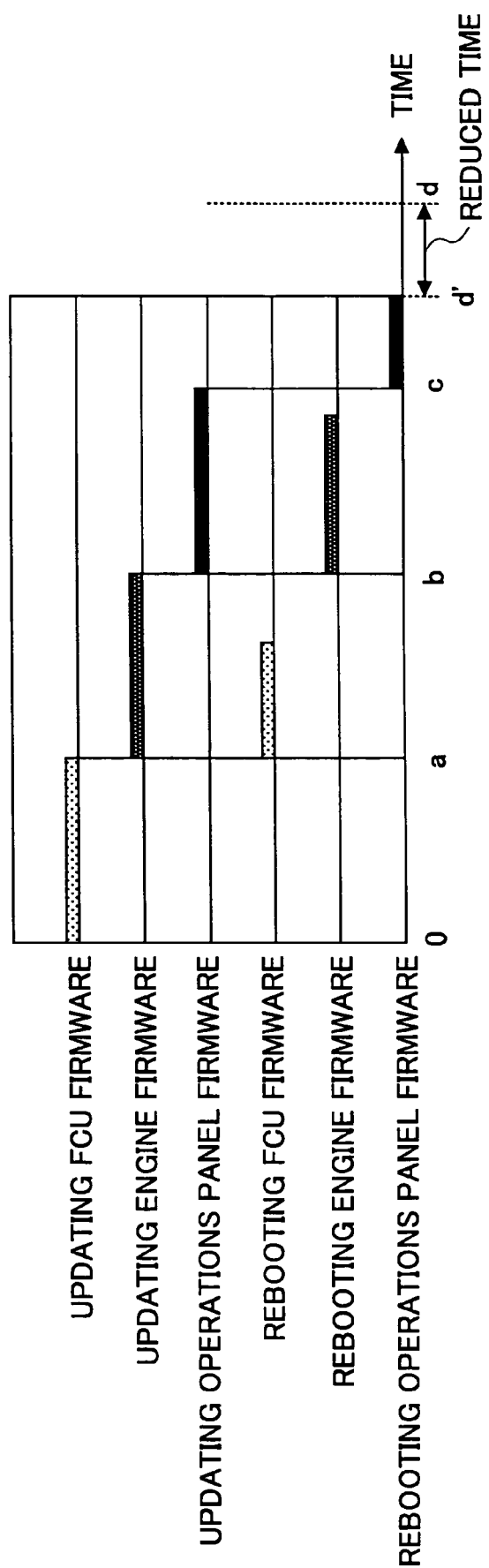
FIG. 24 is a schematic diagram for explaining time required for the process in which each updated program is rebooted as soon as it is updated according to the other embodiment.

FIG. 24 similarly shows the update process of the FCU firmware starting at time 0, the update process of the engine firmware starting at time "a", the update process of the operations panel process starting at time "b". However, FIG. 24 also shows the case in which each firmware is rebooted as soon as it is updated. Accordingly, the reboot process of the updated FCU firmware starts at time "a", the reboot process of the updated engine firmware starts at time "b", and the reboot process of the updated operations panel firmware starts at time "c". It is noted that the reboot process of the updated operations panel firmware ends at time "d" that is earlier than time "d".

As shown in FIG. 24, total time in the case in which the update processes and the reboot processes are performed in parallel is reduced by "d-d'". The total time can be reduced by earlier updating of the program that requires a longer reboot time.

Figure 25:
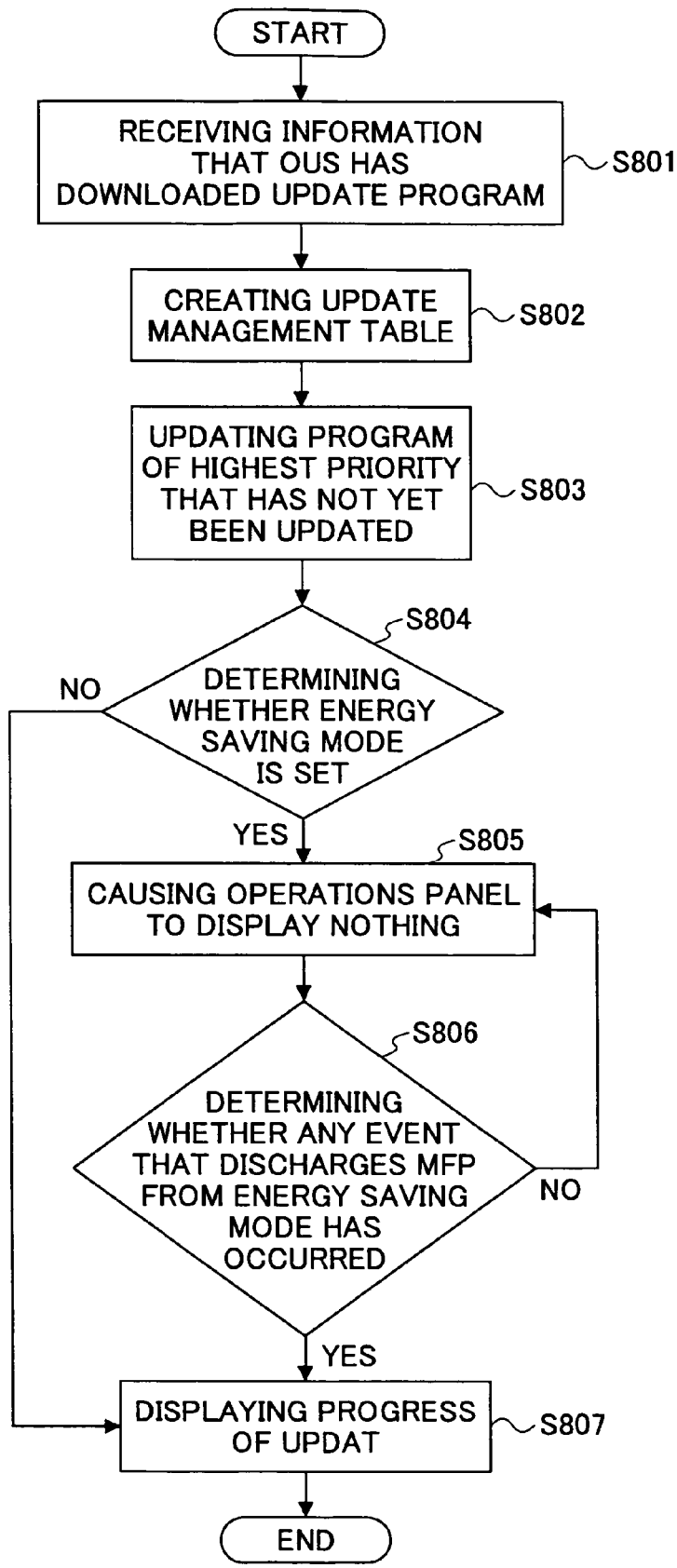
FIG. 25 is a flowchart showing processing for displaying the progress of update according to yet another embodiment.

Referring to FIG. 25, a description is given of processing of the operations panel 39.

In step S801, the SCS 20 is informed by the OUS 19 that the OUS 19 has downloaded the update program. In the next step S802, the SCS 20 creates the update management table.

In step S803, the SCS 20 updates the program of highest priority that has not yet been updated.

In step S804, the SCS 20 determines whether the MFP 1 is set at an energy saving mode. If the MFP 1 is not set at an energy saving mode, the process proceeds to step S807. If an energy saving mode is set, the SCS 20 causes the operations panel firmware 61 to display nothing until the SCS 20 determines in step S806 whether any event that discharges the MFP 1 from the energy saving mode occurs.

An event that discharges the MFP 1 from the energy saving mode is, for example, that an operator touches the touch sensor of the operations panel 39.

When the energy saving mode is terminated, the SCS 20 displays the most updated status in step S807.

A description is given about energy saving modes. There are five energy saving modes as follows: waiting mode, preheated mode, low power consumption mode, silent mode, and engine-off mode. In waiting mode, the MFP 1 is ready for image forming. In preheated mode and low power consumption mode, fixing temperature is reduced. Low power consumption mode corresponds to the energy star mode. The amount of reduction may differ by product and setting. In silent mode, the MFP 1 receives facsimile messages and printer data and stores them in the HDD. However, the fixing unit of the MFP 1 is not provided with power, so the MFP 1 is not ready for forming an image. In engine-off mode, the engine is not operated, with its CPU sleeping or electrically isolated, for example.

Figure 26:
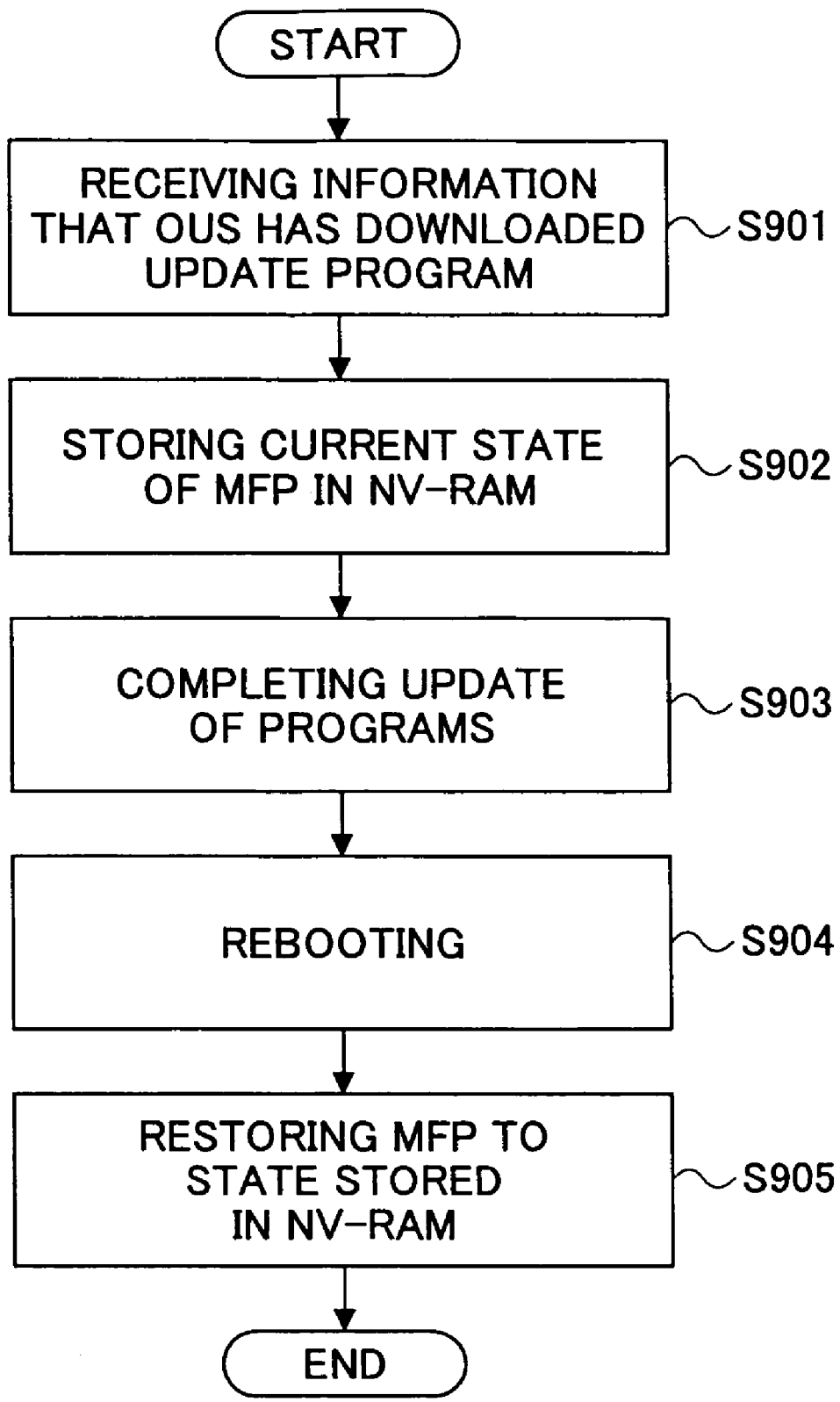
FIG. 26 is a flowchart showing processing for retaining the state of MFP according to yet another embodiment.

Referring to FIG. 26, a process is described in which the MFP 1 is restored to the state thereof before the updating of the programs.

In step S901 corresponding to the step of acquiring the update program, the OUS 19 informs the SCS 20 that the OUS has downloaded the update program. In the next step S902, the SCS 20 stores the current state of the MFP 1 in the NV-RAM 47.

The state of the MFP 1 is, for example, the above power saving mode at which the MFP 1 is set.

The SCS 20 determines that the programs have been updated in step S903, and the SCS 20 reboots the updated programs in step S904.

In step S904 after the reboot, the SCS 20 restores the MFP 1 to the state stored in the NV-RAM 47.

Figure 27:
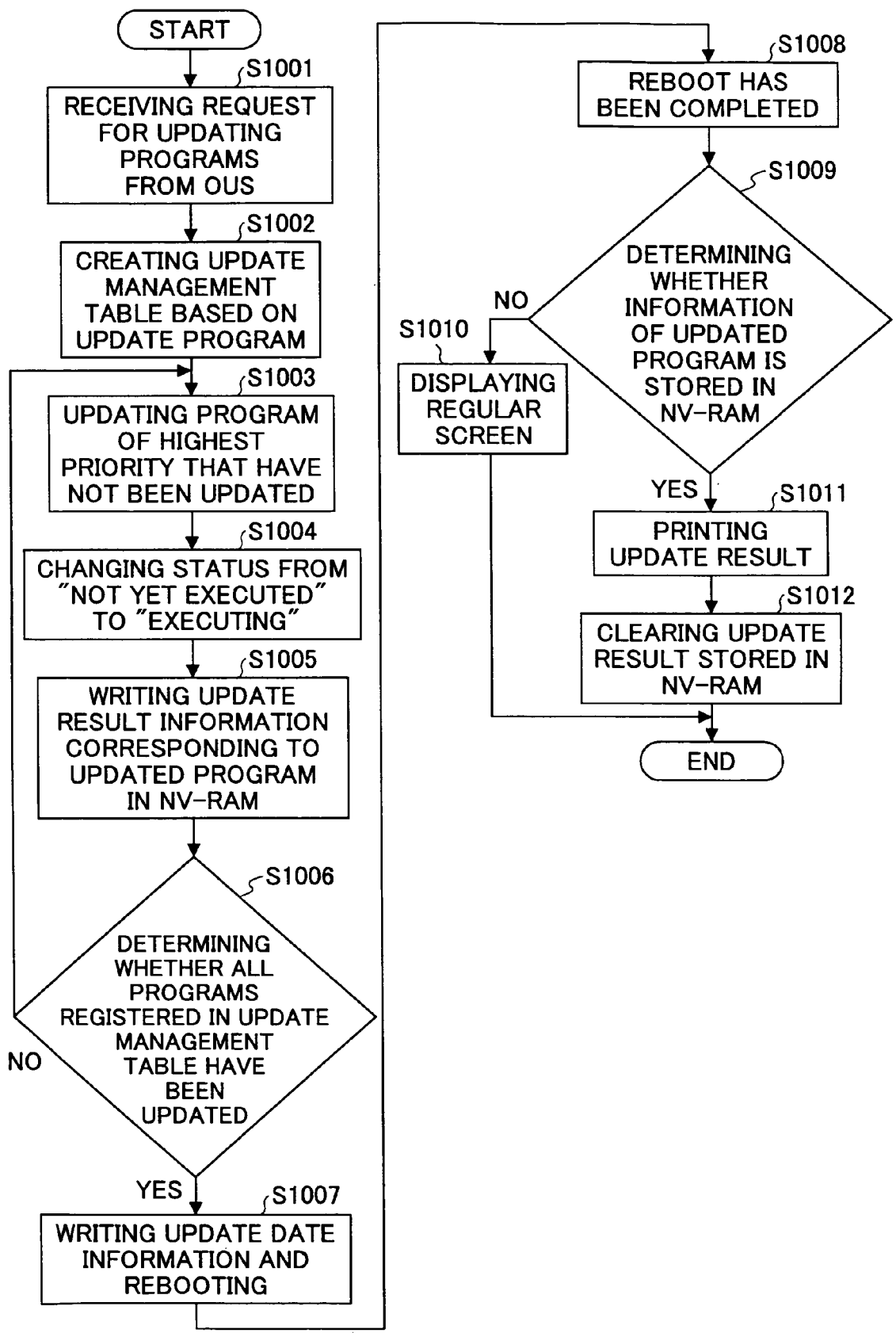
FIG. 27 is a flowchart showing processing for printing the result of update according to yet another embodiment.

A description is given of a process in which operators (users and administrators of the MFP 1) are informed that the programs of the MFP 1 have been updated. The flowchart of FIG. 27 shows processing in which the MFP 1 informs the operators by outputting the result of update on paper.

In step S1001 corresponding to the step of acquiring the update program, the SCS 20 receives from the OUS 19 a request for starting the update of programs. In step S1002, the SCS 20 creates the update management table based on the acquired update program. After creating the update management table, the SCS 20 updates the program of the highest priority that has not yet been updated in step S1003 corresponding to the step of updating the programs.

In step S1004, the SCS 20 changes the "status" of the program that is being updated from "not yet executed" to "being executed" in the update management table. In the next step S1005 corresponding to the step of creating the result of update, the SCS 20 sets an update flag corresponding to each updated program in the NV-RAM 47. The update flag is described in detail later.

In step S1006, the SCS 20 determines whether all programs registered in the update management table have been updated. If the determination is negative, the process returns to step S1003, otherwise proceeds to step S1007.

In step S1007, the SCS 20 records the date and time of update in update date information (to be described later) and reboots the updated programs. In step S1008, the reboot of the updated programs has completed. In step S1009, the SCS 20 determines whether there is information about the updated programs in the NV-RAM 47.

If there is no information about the updated programs stored in the NV-RAM 47, the SCS 20 displays a regular screen on the operations panel 39 in step S1010. The process then ends.

If there is information about the updated programs stored in the NV-RAM 47, the SCS 20 prints the result of update based on the update result information in step S1011 corresponding to the step of outputting the result of update. The information that is printed in this step is further described below.

After printing and discharging the printed paper, the SCS 20 deletes the update result information stored in the NV-RAM 47 in step S1012.

The update flag set in step S1005 in the above flowchart is described below with reference to FIG. 28.

The table shown in FIG. 28 is an exemplary data structure of data that is written in the NV-RAM 47. The data includes a program name, a program version before update, a program version after update, and the result of update.

The program name such as "engine program" indicates the name of a program represented in character codes or pre-allocated codes. The program version before update and the program version after update indicate the version of the program before update and the version of the program after update, respectively, and are represented in character codes. The update result indicates whether the program has been successfully updated. The update result may be indicated by one bit or more.

"NULL" ("0" meaning that no data are stored) indicated in the version after update and the update result of the printer application program means that the printer application program is not updated.

Referring to FIG. 29, the update date information stored in the NV-RAM 47 is described below. The update date information indicates the year, month, day, hour, and minute as shown in FIG. 29.

The contents of the update result information of FIG. 28 and the update date information of FIG. 29 may be altered depending on what is shown to the operator. For example, if only the result of update needs to be shown to the operator, the update result information may require only one bit.

Referring to FIG. 30, the information that is printed in step S1011 is described below. The information that is printed in step S1011 includes program names 211, versions before update 212, versions after update 213, results of update 214, date of update 215, and other typical phrases 216 and 217.

As shown in FIG. 30, all information that is considered necessary for the operator is printed.

Figure 31:
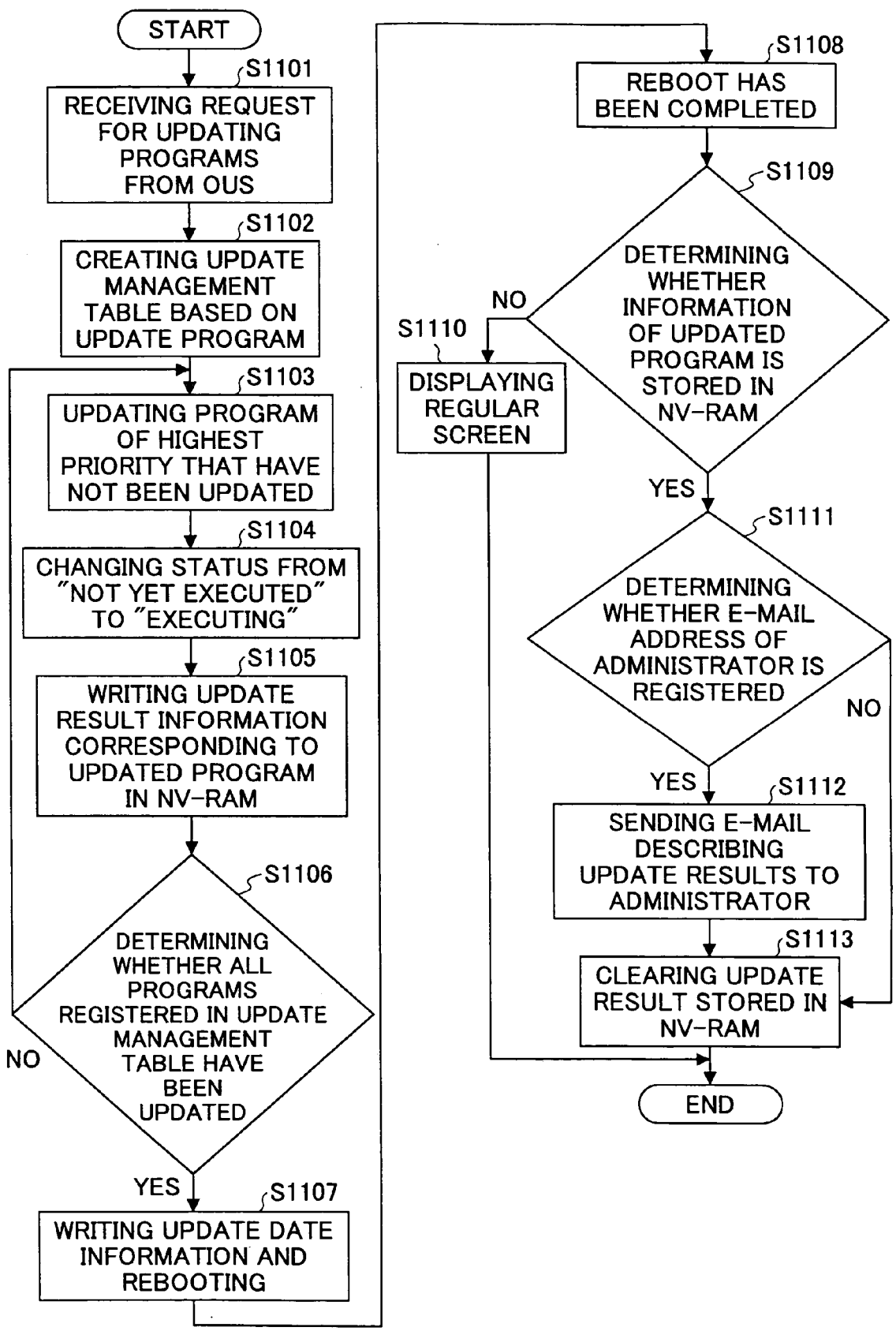
FIG. 31 is a flowchart showing a process in which an e-mail message indicating update results is transmitted according to yet another embodiment.

Referring to the flowchart shown in FIG. 31, a process in which the update result is transmitted to the operator via e-mail is described. Steps S1101 through S1108 of the flowchart shown in FIG. 31 are identical to steps S1001 though S1008 of the flowchart shown in FIG. 27. Accordingly, their description is omitted and steps after S1109 are described below.

After rebooting the updated programs, the SCS 20 determines whether there is information about any updated program stored in the NV-RAM 47 in step S1109.

If there is no information about an updated program stored in the NV-RAM 47, the SCS 20 displays the regular screen on the operations panel 39 in step S1110. The process then ends.

If there is the information about an updated program stored in the NV-RAM 47, the SCS 20 determines whether an e-mail address of an administrator is registered in step S1111. If no e-mail address is registered, the SCS 20 proceeds to step S1113.

If an e-mail address of an administrator is registered, the SCS 20 transmits an e-mail indicating the update result based on the update result information to the administrator in step S1112. After transmitting the e-mail, the SCS 20 deletes the update result information stored in the NV-RAM 47 in step S1113.

Referring to FIG. 32, the contents of the e-mail that is transmitted from the MFP 1 to the administrator are described. The e-mail message shown in FIG. 32 includes the program names 211, the versions before update 212, the versions after update 213, the results of update 214, the date of update 215, and other typical phrases 216 and 217. The contents transmitted as an e-mail message are identical to the contents that are printed.

Figure 33:
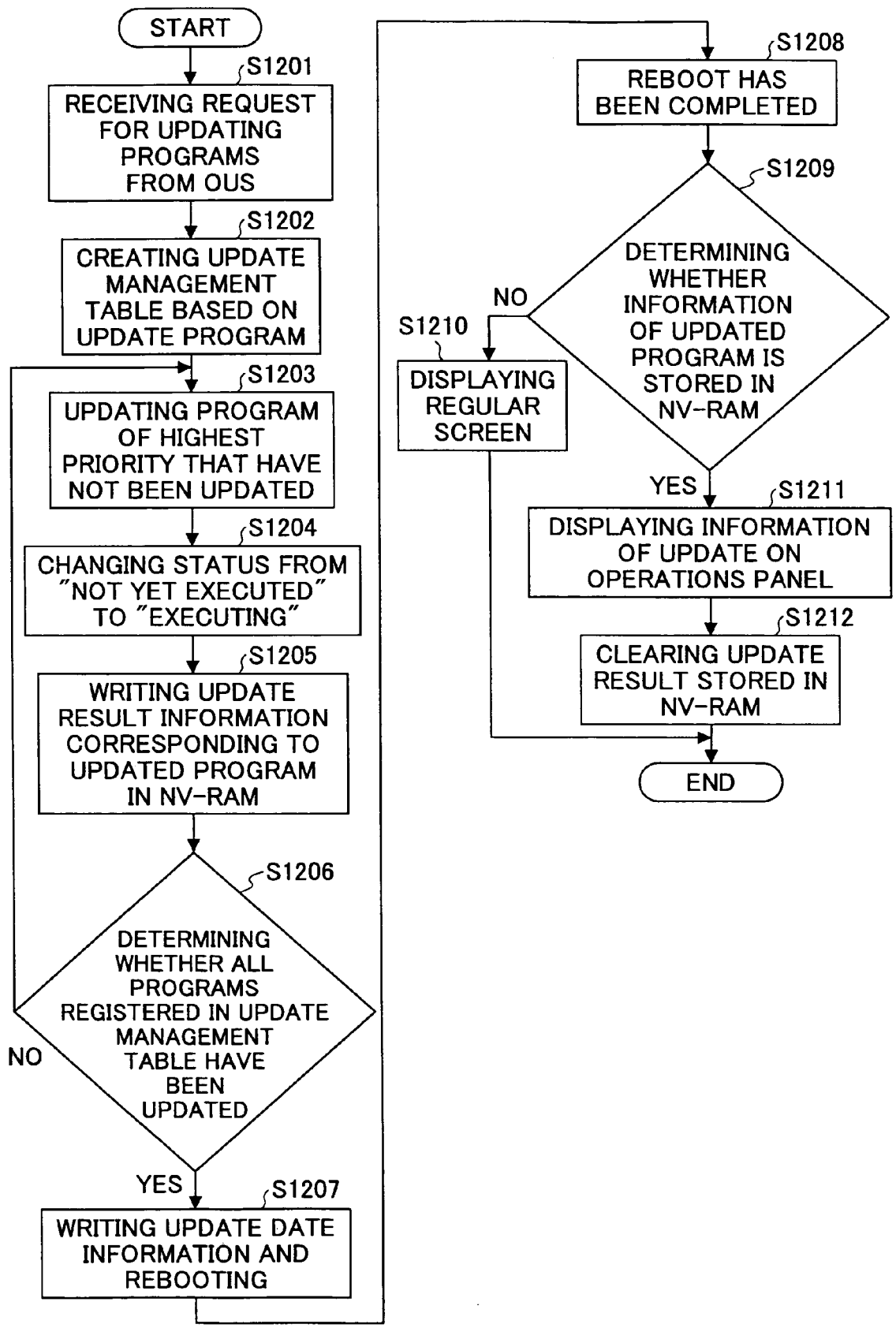
FIG. 33 is a flowchart showing a process in which the update results are displayed.

Referring to a flowchart shown in FIG. 33, a process in which the update results are displayed in the operations panel 39 is described. Steps S1201 through S1208 of the flowchart shown in FIG. 33 are identical to steps S1001 through S1008 of the flowchart shown in FIG. 27. Accordingly, their description is omitted, and only steps after S1208 are described below.

After rebooting the updated programs, the SCS 20 determines whether there is information about any updated program stored in the NV-RAM 47 in step S1209.

If there is no information about an updated program stored in the NV-RAM 47, the SCS 20 displays a regular screen in the operations panel 39 in step S1210. The process then ends.

If there is the information about the updated programs stored in the NV-RAM 47, the SCS 20 displays the result of update in the operations panel 39 based on the update result information stored in the NV-RAM 47 in step S1211.

After displaying the result of update in the operations panel 39, the SCS 20 deletes the update result information stored in the NV-RAM 47 in step S1212. The process then ends.

Figure 34:
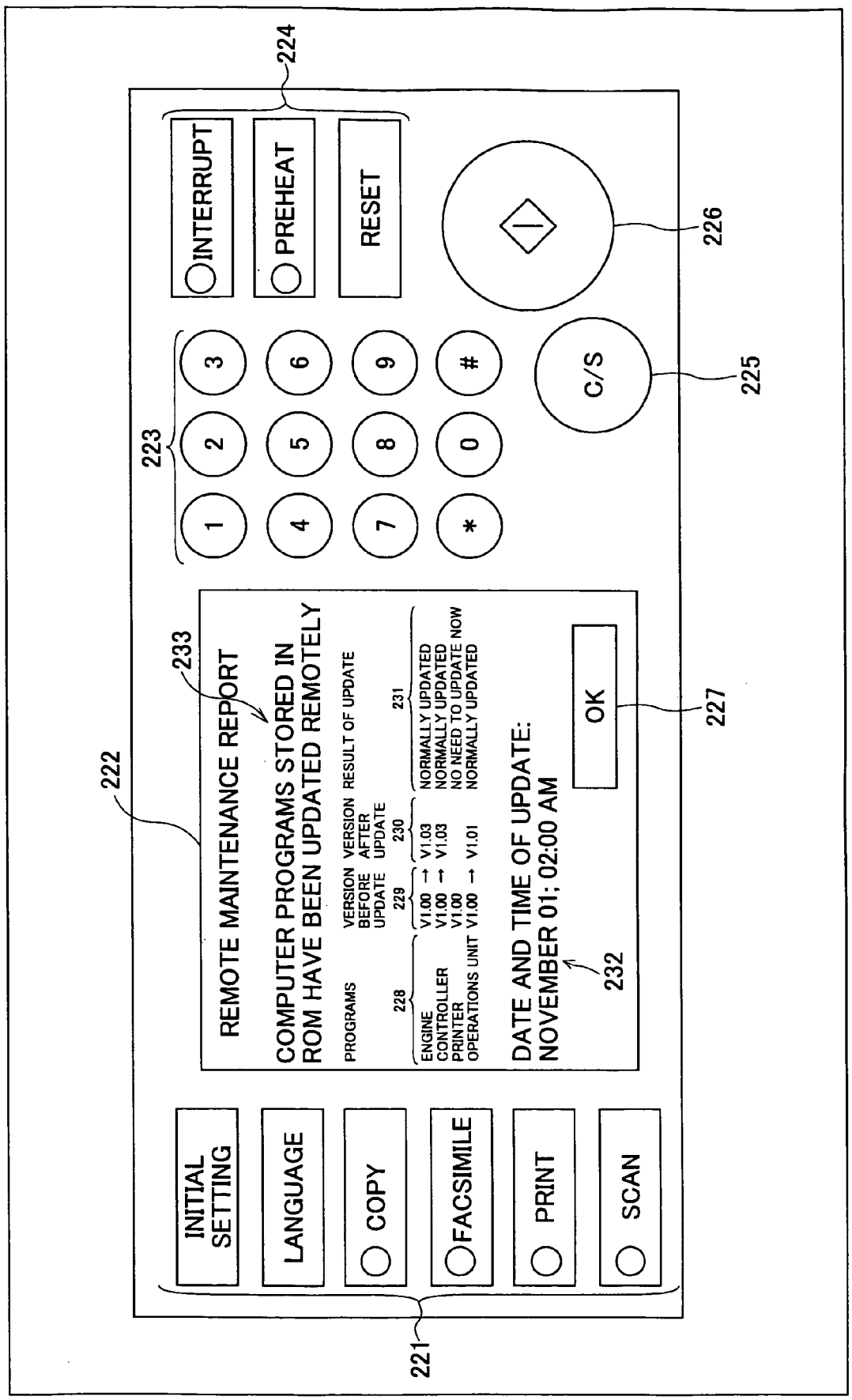
FIG. 34 illustrates an exemplary screen according to an embodiment.

Referring to FIG. 34, the contents of a screen shown on the operations panel 39 are described below.

The screen shown in FIG. 34 includes various keys 221, 223, 224, 225, and 226, and an information screen 222. The information screen 222 includes program names 228, versions before update 229, versions after update 230, results of update 231, the date of update 232, typical phrase 233, and an OK button 227.

The various keys 221, 223, 224, 225, and 226 are used-for operating the MFP 1. The information screen 222 displays information for an operator. The OK button in the information screen 222 is a button that the operator presses to close the information screen. The contents shown in the information screen 222 are identical to the printed information.

Figure 35:
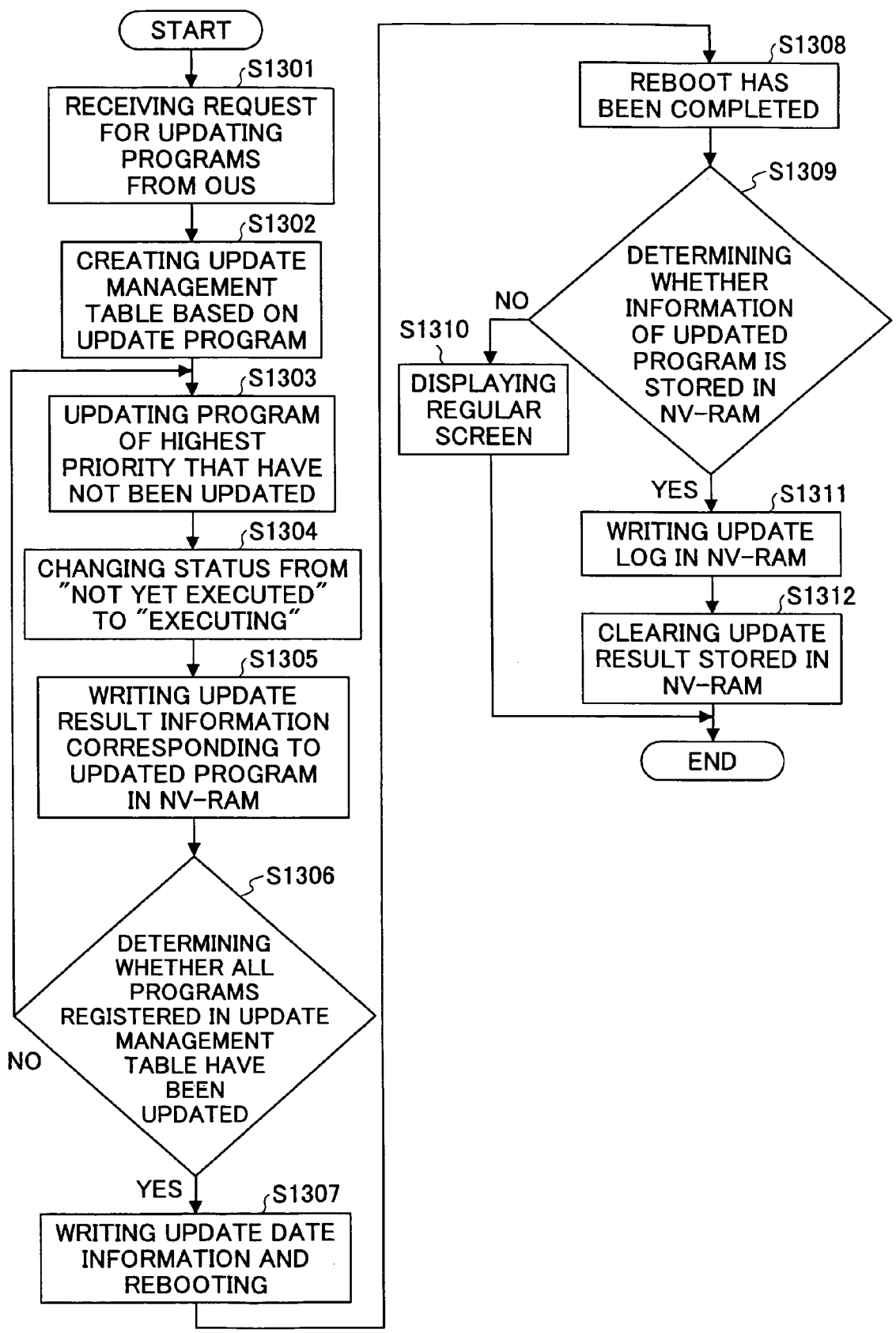
FIG. 35 is a flowchart showing a process in which an update log is stored according to an embodiment.

Referring to a flowchart shown in FIG. 35, a process in which update logs are stored in the NV-RAM 47 is described below. Steps S1301 through S1308 of FIG. 35 are identical to steps S1001 through S1008 of FIG. 27, respectively. Accordingly, their description is omitted, and only steps after S1308 are described below.

After rebooting the updated programs, the SCS 20 determines whether there is information about any updated programs stored in the NV-RAM 47 in step S1309.

If there is no information about the updated programs stored in the NV-RAM 47, the SCS 20 displays the regular screen on the operations panel 39 in step S1310. The process then ends.

If there is information about the updated programs stored in the NV-RAM 47, the SCS 20 deletes the update result information stored in the NV-RAM 47 in step S1312. The process then ends.

Referring to FIG. 36, a description of the update logs is given below. As shown in FIG. 36, the update log includes the program names, the versions before update, the versions after update, the update results, and the date of update that are included in the update results information by the update dates.

The update results of programs are recorded every time the programs are updated. The update log shown in FIG. 36 includes the update results performed at 4:00 AM on Dec. 15, 2001, through 2:00 AM on Nov. 1, 2002, for example.

In an embodiment of the present invention, Low cost flash memories may be used as the NV-RAM 47 that stores the update program.

The present invention is not limited to these embodiments, and various variations and modifications may be made without departing from the scope of the present invention.

This patent application is based on Japanese Priority Patent Applications No. 2002-333966 filed on Nov. 18, 2002, No. 2002-342827 filed on Nov. 26, 2002, No. 2002-348317 filed on Nov. 29, 2002, and No. 2003-364032 filed on Oct. 24, 2003, the entire contents of which are hereby incorporated by reference.

What is claimed is:

1. An image forming apparatus, comprising:
a plurality of processing units wherein each processing unit processes data for forming an image;
a control unit that communicates with each of said plurality of processing units directly, or indirectly through another one or more of said processing units;
an update program acquiring unit that acquires update programs configured to update corresponding programs of said processing units; and
a program updating unit that updates the corresponding programs of said processing units in a prioritized update order in which the processing unit or processing units which are indirectly communicated with by said control unit are assigned a highest priority so as to be updated before any of said processing units directly communicated with by said control unit.

2. The image forming apparatus as claimed in claim 1, wherein said program updating unit also determines a priority order in which the programs of said processing units which are directly communicated with by said control unit and said control unit itself are updated as part of said prioritized update order thereby to create prioritized update order information.

3. The image forming apparatus as claimed in claim 2, wherein said program updating unit correlates the prioritized update order in which the programs of said processing units and of said control unit itself are updated with names of the programs.

4. The image forming apparatus as claimed in claim 2, wherein the prioritized update order information includes information indicating update status.

5. The image forming apparatus as claimed in claim 1, wherein
said control unit has one or more application programs related to image forming processing; and
said program updating unit can update the application programs individually.

6. The image forming apparatus as claimed in claim 1, wherein
one of said processing units is a display unit that displays information of the image forming apparatus; and
said program updating unit updates the program of the display unit after the programs of other processing units and the program of said control unit are updated.

7. The image forming apparatus as claimed in claim 1, further comprising a communication unit configured to connect the image forming apparatus to a network; wherein
said update program acquiring unit acquires the update programs using said communication unit.

8. The image forming apparatus as claimed in claim 7, wherein said control unit reboots updated ones of said processing units in a same order as the prioritized update order in which said processing units are updated.

9. The image forming apparatus as claimed in claim 7, wherein said control unit reboots updated ones of said processing units after all to-be-updated programs have been updated.

10. The image forming apparatus as claimed in claim 7, wherein said control unit includes a primary program stored in a first memory region and a secondary program duplicating at least some of the primary program stored in a second memory region other than a first memory region in which the primary program is stored, the control unit being configured to execute the secondary program while the primary program is being updated.

11. The image forming apparatus as claimed in claim 10, wherein said second memory region is part of a volatile memory.

12. The image forming apparatus as claimed in claim 11, wherein the secondary program is smaller in size than the primary program.

13. The image forming apparatus as claimed in claim 7, wherein said control unit, when updating the program of one of said processing units, causes the one of said processing units being updated to operate in a restricted mode.

14. The image forming apparatus as claimed in claim 7, wherein after said update programs are all acquired using said communication unit and the connection between the image forming apparatus and the network is disconnected, the control unit reboots itself.

15. The image forming apparatus as claimed in claim 7, wherein said control unit reboots itself in a predetermined time after the last one of updated processing units is rebooted.

16. The image forming apparatus as claimed in claim 7, wherein said control unit stores information indicating a state of the image forming apparatus in a non-volatile storage unit before rebooting itself, and restores the image forming apparatus to the stored state after rebooting itself.

17. The image forming apparatus as claimed in claim 16, wherein the state of the image forming apparatus is a state in which the power consumption of the image forming apparatus is reduced.

18. The image forming apparatus as claimed in claim 17, further comprising a display unit that displays information related to the image forming apparatus;
wherein the state of the image forming apparatus is information displayed on the display unit.

19. The image forming apparatus as claimed in claim 18, wherein said display unit displays the progress of the update of the programs.

20. The image forming apparatus as claimed in claim 19, wherein said display unit, if the image forming apparatus is set at the state in which the power consumption thereof is reduced, does not display the progress of the update of the programs.

21. The image forming apparatus as claimed in claim 7, wherein said program updating unit creates an update management table including information related to each acquired update program.

22. The image forming apparatus as claimed in claim 21, wherein the update management table includes module IDs that specify each acquired update program.

23. The image forming apparatus as claimed in claim 7, wherein said processing units include processing units that said control unit can directly reboot and processing units that automatically reboot themselves in response to a request from said control unit.

24. The image forming apparatus as claimed in claim 7, further comprising:
an update result information creating unit that creates update result information indicating results of the update of the programs; and
an update result outputting unit that outputs the update results based on the update result information.

25. The image forming apparatus as claimed in claim 24, wherein said update result outputting unit either prints the update results, transmits an e-mail message indicating the update results, or displays a screen indicating the update results.

26. The image forming apparatus as claimed in claim 24, wherein the update result information includes at least one of the version of a program before update, the version of the program after update, the date and time the program is updated, and whether the program is updated successfully.

27. The image forming apparatus as claimed in claim 24, wherein said update result information creating unit stores the update result information in a non-volatile storage unit.

28. The image forming apparatus as claimed in claim 27, wherein said update result information creating unit accumulates the update result information.

29. The image forming apparatus as claimed in claim 27, wherein
said control unit restarts the image forming apparatus after said update result information creating unit stores the update result information in the non-volatile storage unit; and
said update result outputting unit outputs the update results after the image forming apparatus is restarted.

30. The image forming apparatus as claimed in claim 1, wherein a processing unit or processing units which indirectly communicate with said control unit through two others of said processing units are assigned a higher priority than a processing unit or processing units which indirectly communicate with said control unit through only one other of said processing units so as to be updated before the processing unit or processing units which indirectly communicate with said control unit through only one other of said processing units.

31. The image forming apparatus as claimed in claim 1, wherein the prioritized update order for the highest priority processing unit or processing units that are indirectly communicated with by said control unit includes further prioritized ordering based on a number of processing units forming each indirect connection so that the processing unit or processing units with the largest number of processing units forming the indirect connection are updated first.

32. A method of updating a plurality of programs corresponding to a plurality of processing units associated with an image forming apparatus that processes data for forming an image, the image forming apparatus including a control unit that communicates with each of said plurality of processing units directly, or indirectly through another one or more of said processing units, the method comprising:

acquiring update programs configured to update at least the programs corresponding to a plurality of processing units; and updating each of the programs corresponding to at least the plurality of processing units in a prioritized update order in which the processing unit or processing units which are indirectly communicated with by said control unit are assigned a highest priority so as to be updated before any of the processing units directly communicated with by said control unit.

33. The method as claimed in claim 32, further comprising:

rebooting each processing unit in which one of the programs is updated.

34. The method as claimed in claim 33, wherein the processing units in which the programs are updated are rebooted in a same order in which the programs are updated.

35. The method as claimed in claim 32, further comprising:

creating update result information indicating update results of the programs; and outputting the update results of the programs based on the update result information.

36. The method as claimed in claim 35, wherein, in the step of outputting the update results, the update results are either printed, transmitted as an e-mail message, or displayed on a display unit.

37. The method as claimed in claim 35, wherein the update result information includes at least one of the version before the update, the version after the update, the date and time of the update, and whether the program has been updated successfully.

38. The method as claimed in claim 37, wherein, in the step of creating the update result information, the update result information is added to past update result information.

39. The method as claimed in claim 35, further comprising restarting the image forming apparatus after the step of creating the update result information.

40. The method as claimed in claim 39, wherein, in the step of creating the update result information, the update result information is stored in a non-volatile storage unit before the image forming apparatus is restarted.

41. The method as claimed in claim 32, wherein, in the step of updating each of the programs corresponding to at least the plurality of processing units in a prioritized update order, a processing unit or processing units which indirectly communicate with said control unit through two others of said processing units are assigned a higher priority than a processing unit or processing units which indirectly communicate with said control unit through only one other of said processing units so as to be updated before the processing unit or processing units which indirectly communicate with said control unit through only one other of said processing units.

42. The method as claimed in claim 32, wherein, in the step of updating each of the programs corresponding to at least the plurality of processing units in a prioritized update order, the processing unit or processing units which indirectly communicate with said control unit through a greatest number of others of said processing units are updated first.

* * * * *